(12) United States Patent
Galker

(10) Patent No.: US 7,774,315 B1
(45) Date of Patent: Aug. 10, 2010

(54) BACKUP SYSTEM

(76) Inventor: Eldad Galker, 15 Habanim Street, Nes Ziona (IL) 74071

( * ) Notice: Subject to any disclaimer, the term of this patent is extended or adjusted under 35 U.S.C. 154(b) by 855 days.

(21) Appl. No.: 10/157,261

(22) Filed: May 28, 2002

(51) Int. Cl.
*G06F 12/00* (2006.01)
*G06F 17/30* (2006.01)

(52) U.S. Cl. ............... 707/644; 707/645; 707/646; 707/647; 707/654

(58) Field of Classification Search ......... 707/200, 707/202, 203, 204, 205, 206
See application file for complete search history.

(56) References Cited

U.S. PATENT DOCUMENTS

| | | | | |
|---|---|---|---|---|
| 5,574,906 | A * | 11/1996 | Morris ..................... | 707/1 |
| 5,630,093 | A * | 5/1997 | Holzhammer et al. ....... | 711/115 |
| 5,778,395 | A * | 7/1998 | Whiting et al. ............ | 707/204 |
| 5,873,076 | A * | 2/1999 | Barr et al. ................ | 707/3 |
| 5,909,540 | A * | 6/1999 | Carter et al. .............. | 714/4 |
| 6,006,274 | A * | 12/1999 | Hawkins et al. .......... | 709/248 |
| 6,167,408 | A | 12/2000 | Cannon et al. | |
| 6,195,767 | B1 | 2/2001 | Adams | |
| 6,199,178 | B1 | 3/2001 | Schneider et al. | |
| 6,243,705 | B1 * | 6/2001 | Kucala ..................... | 707/10 |
| 6,330,618 | B1 * | 12/2001 | Hawkins et al. .......... | 709/248 |
| 6,516,337 | B1 * | 2/2003 | Tripp et al. .............. | 709/202 |
| 6,711,609 | B2 * | 3/2004 | Boyer et al. .............. | 709/206 |
| 6,748,447 | B1 * | 6/2004 | Basani et al. ............. | 709/244 |

* cited by examiner

*Primary Examiner*—Baoquoc N To
(74) *Attorney, Agent, or Firm*—Merchant & Gould P.C.

(57) ABSTRACT

Backup system for backing up basic data elements accessible via a network, the backup system comprising a controller, a communication interface, a backup storage unit, for storing backup versions of the basic data elements and a comparator, for comparing between a list of basic data elements from a storage area of the network and a respective list of backed up basic data elements, thereby detecting new basic data elements listed in the list of basic data elements and absent from the respective list of backed up basic data elements, modified basic data elements listed in the list of data elements differently than in the respective list of backed up basic data elements and deleted basic data elements absent from the list of basic data elements and listed in the respective list of backed up basic data elements, wherein the controller backs up the storage area of the network by copying the entirety of the new basic data elements and the modified basic data elements into the backup storage unit, and wherein the controller produces a deleted-element indicator respective of each of the deleted basic data elements, in the backup storage unit.

13 Claims, 22 Drawing Sheets

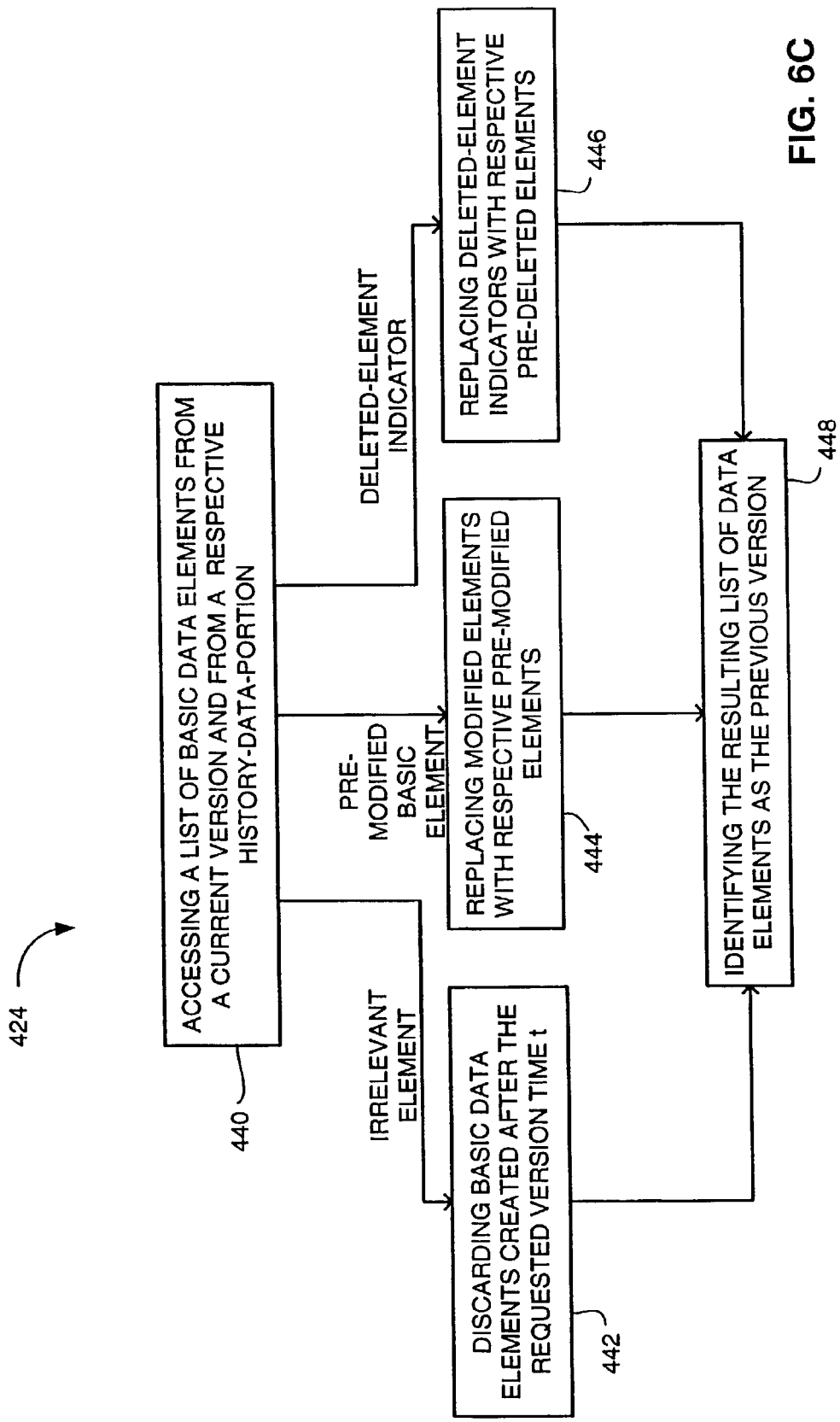

CURRENT-BACKUP SECTION

HISTORY-BACKUP SECTION

| | TIME PERIOD | NUMBER OF FILES KEPT | REMARKS |
|---|---|---|---|
| $702_1$ | LAST 12 HOURS | ALL | |
| $702_2$ | PREVIOUS 12 HOURS | 50% | EVERY OTHER VERSION |
| $702_3$ | PREVIOUS DAY | 3 | FIRST, LAST, MIDDLE |
| $702_4$ | PREVIOUS DAY | 1 | LAST |
| $702_5$ | PREVIOUS DAY | 1 | LAST |
| $702_6$ | PREVIOUS DAY | 1 | LAST |
| $702_7$ | PREVIOUS 3 DAYS | 1 | LAST |
| $702_8$ | PREVIOUS 4 DAYS | 1 | LAST |
| $702_9$ | PREVIOUS WEEK | 1 | LAST |
| $702_{10}$ | PREVIOUS WEEK | 1 | LAST |
| $702_{11}$ | PREVIOUS 2 WEEKS | 1 | LAST |
| $702_{12}$ | PREVIOUS MONTH | 1 | LAST |
| $702_{13}$ | PREVIOUS 2 MONTHS | 1 | LAST |
| $702_{14}$ | PREVIOUS 4 MONTHS | 1 | LAST |
| $702_{15}$ | PREVIOUS YEAR | 2 | MIDDLE, LAST |
| $702_{16}$ | PREVIOUS YEAR | 1 | LAST |
| | o o o | | |
| $702_R$ | ORIGINAL VERSION | 1 | |

FIG. 10A

BACKUP SYSTEM

FIELD OF THE DISCLOSED TECHNIQUE

The disclosed technique relates to information management systems and methods, in general and to information backup methods and systems, in particular.

BACKGROUND OF THE DISCLOSED TECHNIQUE

Information, and for that matter data, is a valuable asset. It will be appreciated by those skilled in the art that the probability of data being corrupted due to an error, malfunction, intentional damage and the like is considered an inevitable event and cannot be ignored.

Data backup systems are known in the art and are used to obtain and manage copies of the backed up information. To store the backed up information, these systems use different storage devices such as hard disk drives and tape drives. Conventional backup systems are divided into three categories, which are online backup systems, near line backup systems and off line backup systems (batch backup systems).

Information retaining systems often operate within the backed up system, and include at least one additional hard-disk-drive and continuously maintain a copy of the backed up information on that additional hard-disk-drive. One method for use in such systems is known as Mirroring, wherein the backed up hard-disk-drive is copied in full onto a backup hard-disk-drive.

Another information-retaining system is known as RAID and is provided in a number of levels. For example, RAID level 5 requires at least two additional hard-disk-drives, to the primary drive. If for any reason, one of the hard-disk-drives fails, the system automatically recovers the lost portions of data, from the remaining hard-disk-drives to a new hard drive, which replaces the hard-drive that failed. RAID systems, Mirror systems, Cluster systems and others are known in the art as fault tolerance systems. Such systems conventionally do not preserve multi-generation historical versions of the information.

Conventional backup systems perform two types of backup sessions—full backup session and modified backup session. In a full backup session, the backup system literally makes a complete copy of the entire amount of the information. During a modified backup session, the system detects any difference between the latest backup copy and the latest version of the backed up information, and stores only that difference. It is noted that a full backup session generally requires large amounts of time and media. However, full backup sessions should be performed regularly, in order to maintain the integrity of the data. Conventional data backup systems back up the information for which they are responsible, using one of the following methods which are: full backup method, differential backup method and incremental backup method. In a full backup methodology, all backup sessions are full backup sessions.

According to the differential and incremental backup methods, both full and modified backup sessions are held. For example, a full backup session may be performed once a week, while a modified backup session is held every hour.

According to the differential backup method, during a modified backup session the system backs up the data which has been modified since the most recent full backup session. According to the incremental backup method, during a modified backup session the system backs up the data which has been modified since the most recent full or modified backup session.

Network backup systems are also known in the art. Such a system is coupled with the backed up nodes via network communication and has clients running on each of the backed up nodes, which determine the portions and nature of the data which is to be backed up.

SUMMARY OF THE DISCLOSED TECHNIQUE

It is an object of the disclosed technique to provide a novel method for backing up information, which overcomes the disadvantages of the prior art.

In accordance with the disclosed technique, there is thus provided a backup system for backing up basic data elements, which are accessible via a network. The backup system includes a controller, a communication interface, a backup storage unit and a comparator. The controller is coupled with the communication interface, the backup storage unit and the comparator. The backup storage unit stores backup versions of the basic data elements. The comparator compares between a list of basic data elements from a storage area of the network and a respective list of backed up basic data elements, thereby detecting new basic data elements, modified basic data elements or deleted basic data elements. The controller backs up the storage area of the network by copying the entirety of each new basic data element and each modified basic data element into the backup storage unit. In addition, the controller produces a deleted-element indicator respective of each deleted basic data element.

The storage unit can include a current-backup section, for storing most recent backup versions, and a history-backup section for storing older backup versions, moved thereto from the current-backup section. The backup system can further include a scheduler, coupled with the controller, for scheduling backup sessions.

In accordance with another aspect of the disclosed technique, there is thus provided a method for backing up basic data elements, which are accessible via a network. The method includes the procedures of accessing a data storage area at selected points in time, retrieving a list of basic data elements from the data storage area, detecting differences between the list of basic data elements and a respective list of backed up basic data elements and procedures for backing up the basic data elements according to detected differences.

One backing up procedure includes storing a backup copy of a new basic data element when the new basic data element is listed in the list of basic data elements and absent from the respective list of backed up basic data elements. Another backing up procedure includes storing a backup copy of a modified basic data element when the modified basic data element is listed in the list of data elements differently than in the respective list of backed up data elements. A further backing up procedure includes producing a deleted-element indicator respective of a deleted basic data element, when the deleted basic data element is listed in the respective list of backed up basic data elements and absent from the list of basic data elements.

In accordance with a further aspect of the disclosed technique, there is provided a database, containing a representation of the backup versions stored within the system. The backup system includes a current-backup section and a history-backup section. The current-backup section contains copies of the current version of a plurality of files, arranged in a station\storage-device\directory-tree\file-copy structure. The history-backup section contains copies of historical versions of these files, arranged in a date&time\station\storage-device\directory-tree\file-copy order. The database structure includes a storage level structure which is identical to the station\storage-device\directory-tree\file-copy structure. The database further includes a plurality of records, each respective of either one of the current-backup copies or one of the history-backup copies.

Each of the records is located within the storage level structure, at a location, which is respective of the location of its respective backup copy. Each of the records can include data respective of the backup time and date relating to its respective backup copy. Each of the records can include a pointer to its respective backup copy.

In accordance with the disclosed technique, there is provided a method for controlling backup storage volume in a multi-version backup system, the multi-version backup system including a current-backup section and a history-backup section. The method includes the procedures of determining criteria for deleting basic data element backup versions from the history-backup section, scheduling deletion sessions, and deleting basic data elements meeting the criteria from the history-backup section, during the execution of the deletion sessions.

BRIEF DESCRIPTION OF THE DRAWINGS

The disclosed technique will be understood and appreciated more fully from the following detailed description taken in conjunction with the drawings in which:

FIG. 6C is an illustration in detail of the previous version production procedure of the method of FIG. 6B, in accordance with another embodiment of the disclosed technique;

FIG. 10A is an illustration of a scheme representing criteria for keeping files in a backup system, according to a further embodiment the disclosed technique;

DETAILED DESCRIPTION OF THE DISCLOSED TECHNIQUE

The disclosed technique overcomes the disadvantages of the prior art by providing a novel method for backing up information, which establishes a descending file version structure. The disclosed technique further provides a novel backup system which performs batch backup procedures but provides online restoration.

In the description which follows, the term "version" is used either in the context of a version of a basic data element, such as a file, or as a version of a storage area, such as a directory or folder. A version of a basic data element or a storage area is the instance of the data element or storage area at a specific moment in time, or a copy thereof.

Figure 1:
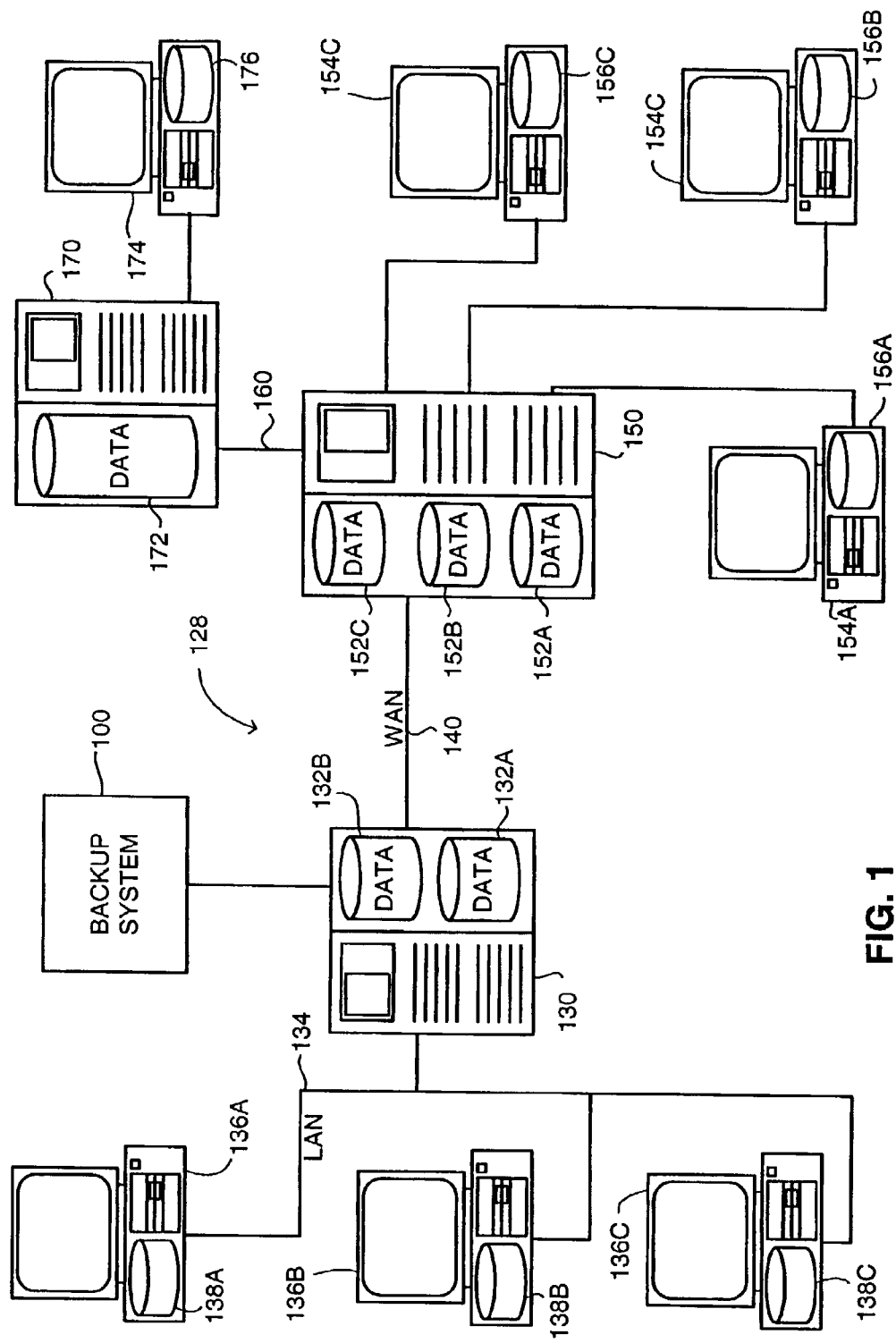
FIG. 1 is a schematic illustration of a computer network and a backup system, constructed and operative in accordance with an embodiment of the disclosed technique.
Figure 2A:
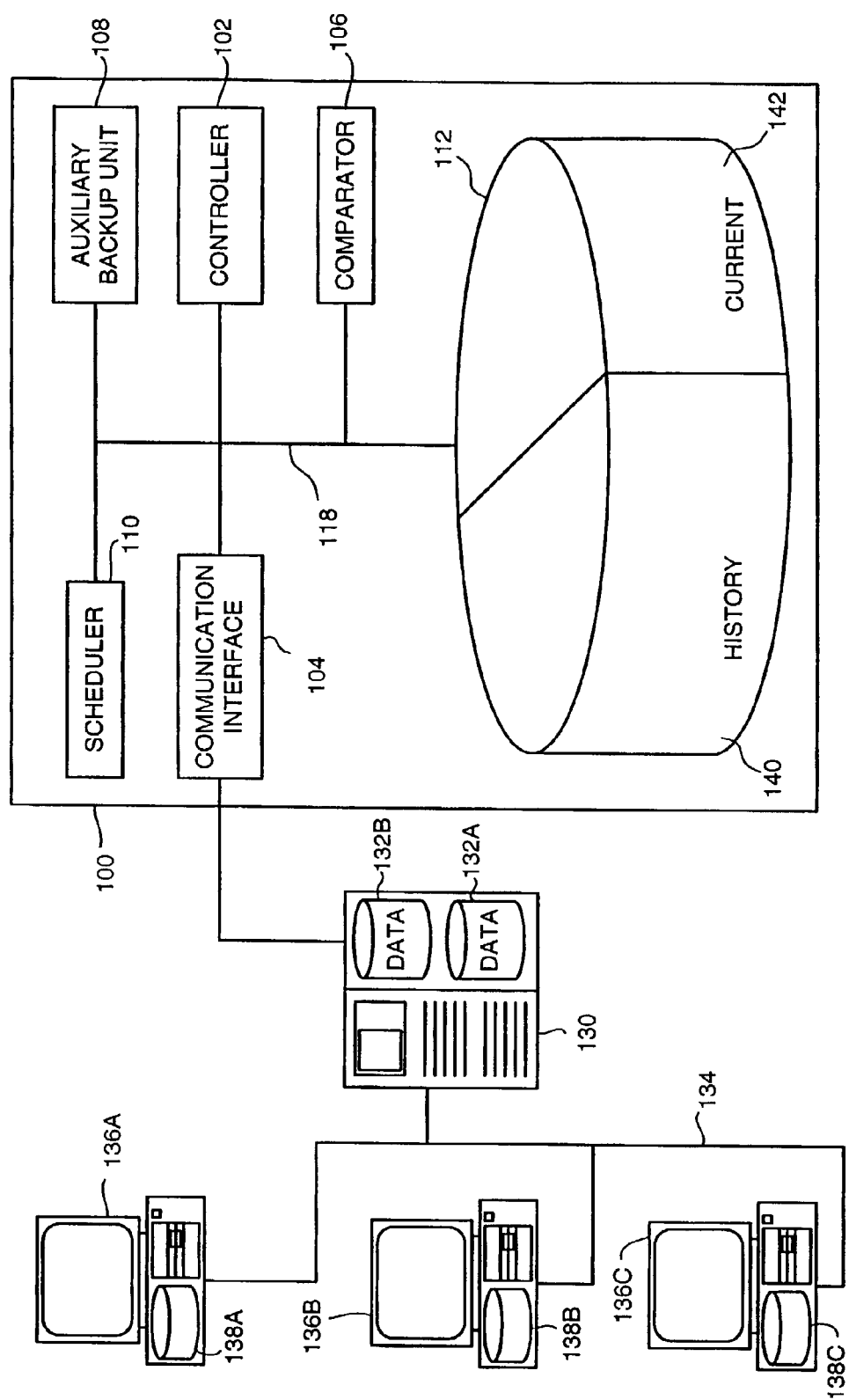
FIG. 2A is an illustration in detail of the backup system and a portion of the computer network of FIG. 1.

Reference is now made to FIGS. 1 and 2A. FIG. 1 is a schematic illustration of a computer network, generally referenced 128 and a backup system, generally referenced 100, constructed and operative in accordance with an embodiment of the disclosed technique. FIG. 2A is an illustration in detail of backup system 100 (FIG. 1) and a portion of computer network 128.

Computer network 128 includes a plurality of servers 130, 150 and 170, and a plurality of computer stations (i.e., client nodes) 136A, 136B, 136C, 154A, 154B, 154C and 174. Network server 130 includes two main storage units 132A and 132B. Network server 130 is coupled with computer stations 136A, 136B and 136C via a local area network (LAN) 134.

Network server 150 includes three main storage units 152A, 152B and 152C. Network server 150 is directly coupled with computer stations 156A, 156B and 156C. Server 170 includes a single storage unit 172 and is coupled with computer station 174. Server 170 is coupled with server 150 via a LAN 160. Server 150 is coupled with server 130 via a wide area network (WAN) 140. Backup system 100 is coupled with server 130. It is noted that backup system 100 can link to any station in the network 128, via server 130, according to an authorization scheme which is predetermined in the network. It is further noted that backup system 100 may link to the network via the World Wide Web (www). Backup system 100 can also backup computers via a plurality of communication interfaces and communication architectures, such as IR, Parallel, Serial, USB, Fire Wire, Modem, and the like.

Computer stations 136A, 136B and 136C each include a storage unit 138A, 138B and 138C, respectively. Computer stations 154A, 154B and 154C each include a storage unit 156A, 156B and 156C, respectively. Computer station 174 includes a storage unit 176.

With reference to FIG. 2A, backup system 100 includes a controller 102, a scheduler 110, a communication interface 104, an auxiliary backup unit 108, a comparator 106 and a storage unit 112. Controller 102, scheduler 110, communication interface 104, auxiliary backup unit 108, comparator 106 and storage unit 112 are all coupled there between via a local bus 118.

Scheduler 110 determines when backup sessions are initiated. In general, a backup session is event driven and can be initiated manually or by means of a predetermined schedule, provided by a scheduler unit such as scheduler 110. Scheduler 110 is operative to initiate a backup procedure randomly, at predetermined points in time, at predetermined intervals, and the like. Comparator 106 is used to compare between data in order to detect changes in the data stored in the network. Storage unit 112 is used to store backup data. Auxiliary backup unit 108 is used to backup storage unit 112. It is noted that auxiliary backup unit 108 may be portable or fixed, and may be on-site or off-site. Controller 102 provides instructions for the other elements of the backup system, and is also operative to store and retrieve data in storage unit 112 and in auxiliary backup unit 108.

Storage unit 112 includes a current-backup section 142 and a history-backup section 140. Current-backup section 142 stores the most recently backed up versions of data elements of network 128. History-backup section 140 stores older versions of data elements of network 128.

It is noted that the separation between the current-backup section and the history-backup section may be either physical (e.g., stored on different storage elements or different network nodes) or logical (e.g., stored on different partitions within a given physical hard drive or different directories in the same partition). Furthermore, each of these sections can spread across different physical or logical units. For example, the current-backup section may be defined across several physical storage units (e.g., hard drives or network nodes).

Backup system 100 communicates with any node in the network 128 via communication interface 104. Hence, backup system 100 can access any storage unit, which is available on the network 128. It is noted that communication interface 104 can include a network interfacing device operating according to any known data communication protocol such as TCP/IP, IPX/SPX, Ether Talk, and the like.

Figure 2B:
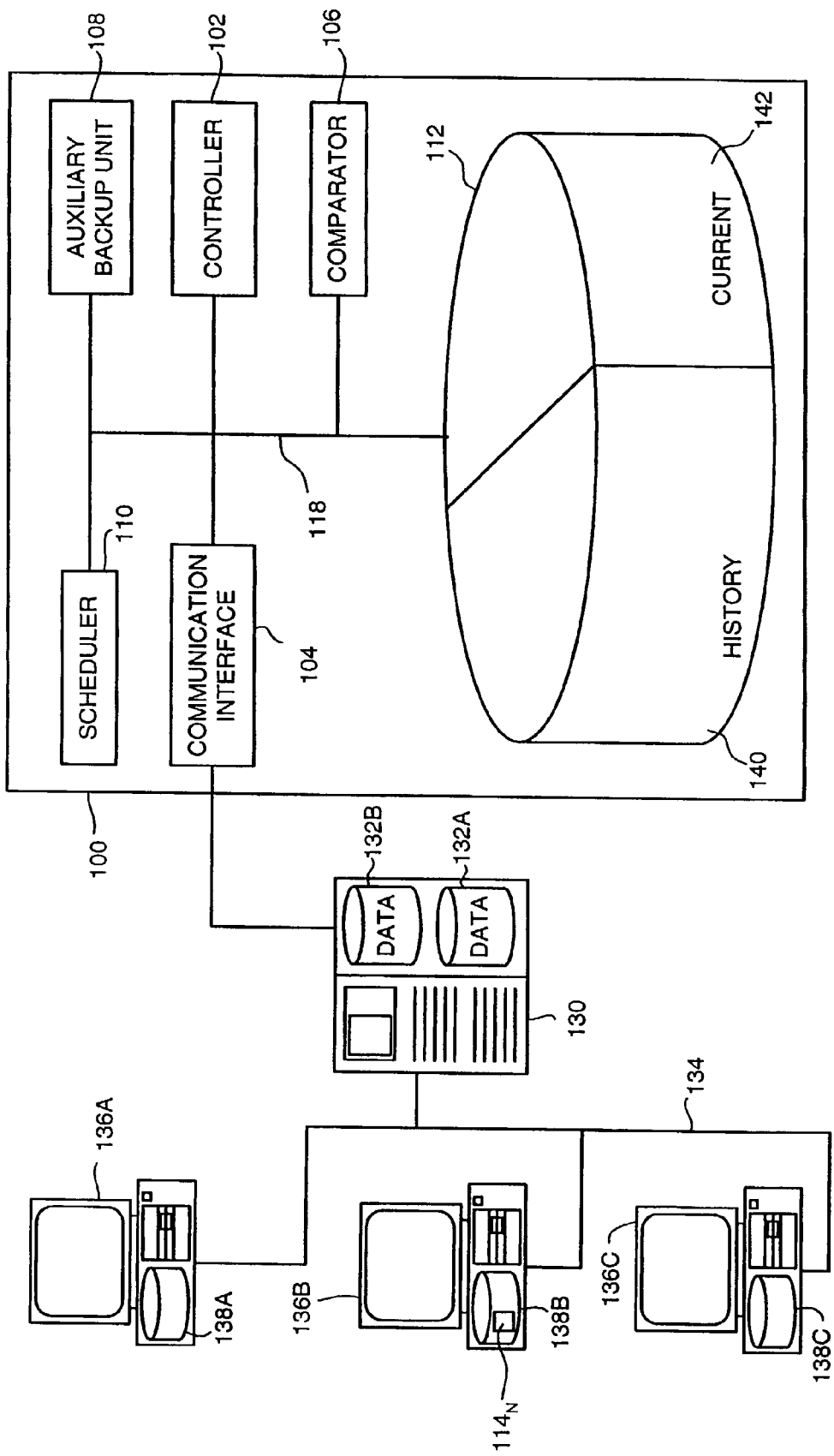
FIG. 2B is an illustration in detail of the backup system and a portion of the computer network 128 of FIG. 1, at one moment in time.
Figure 2C:
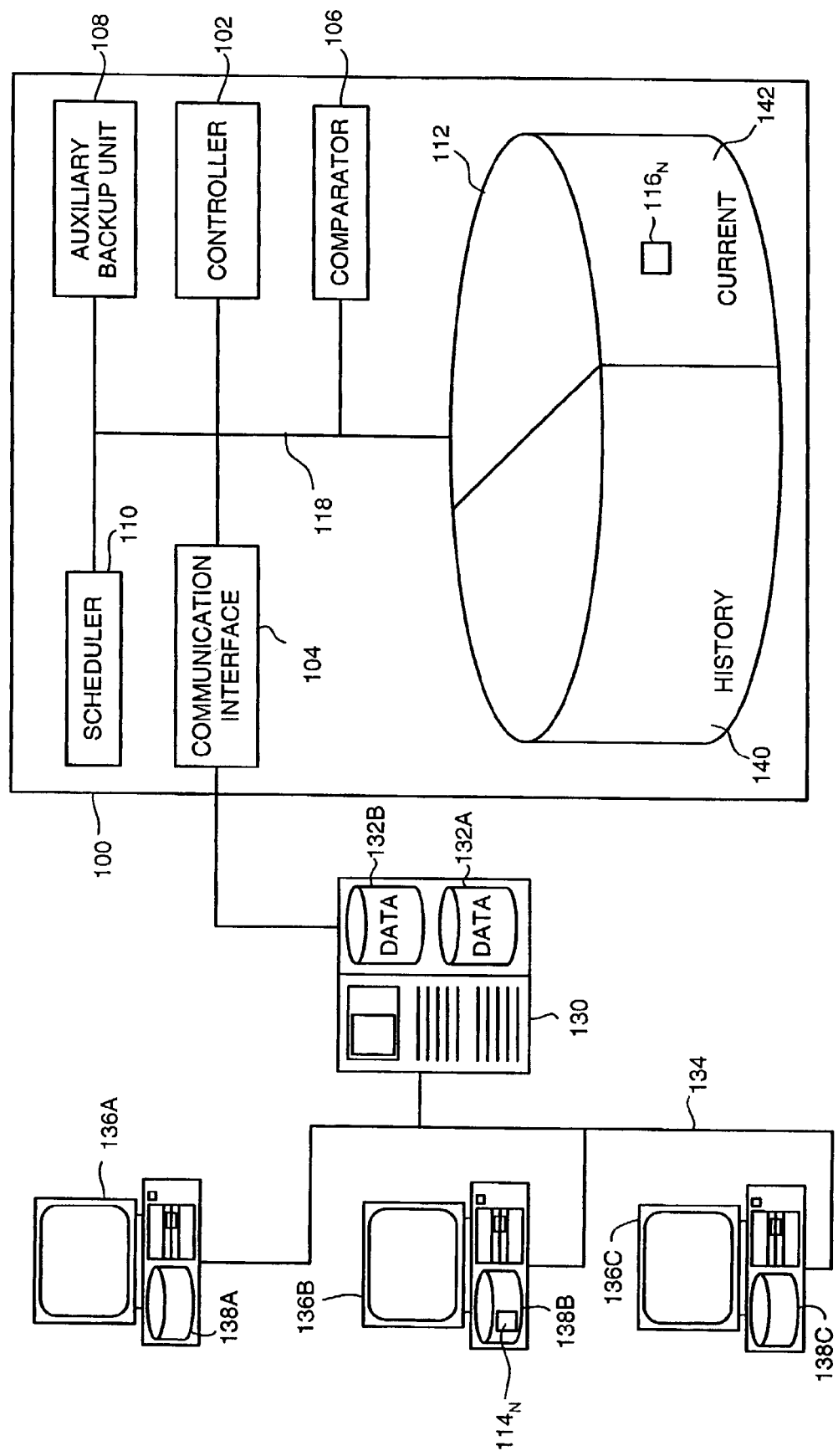
FIG. 2C is an illustration in detail of the backup system and portion of the computer network of FIG. 2A, at another moment in time.
Figure 2D:
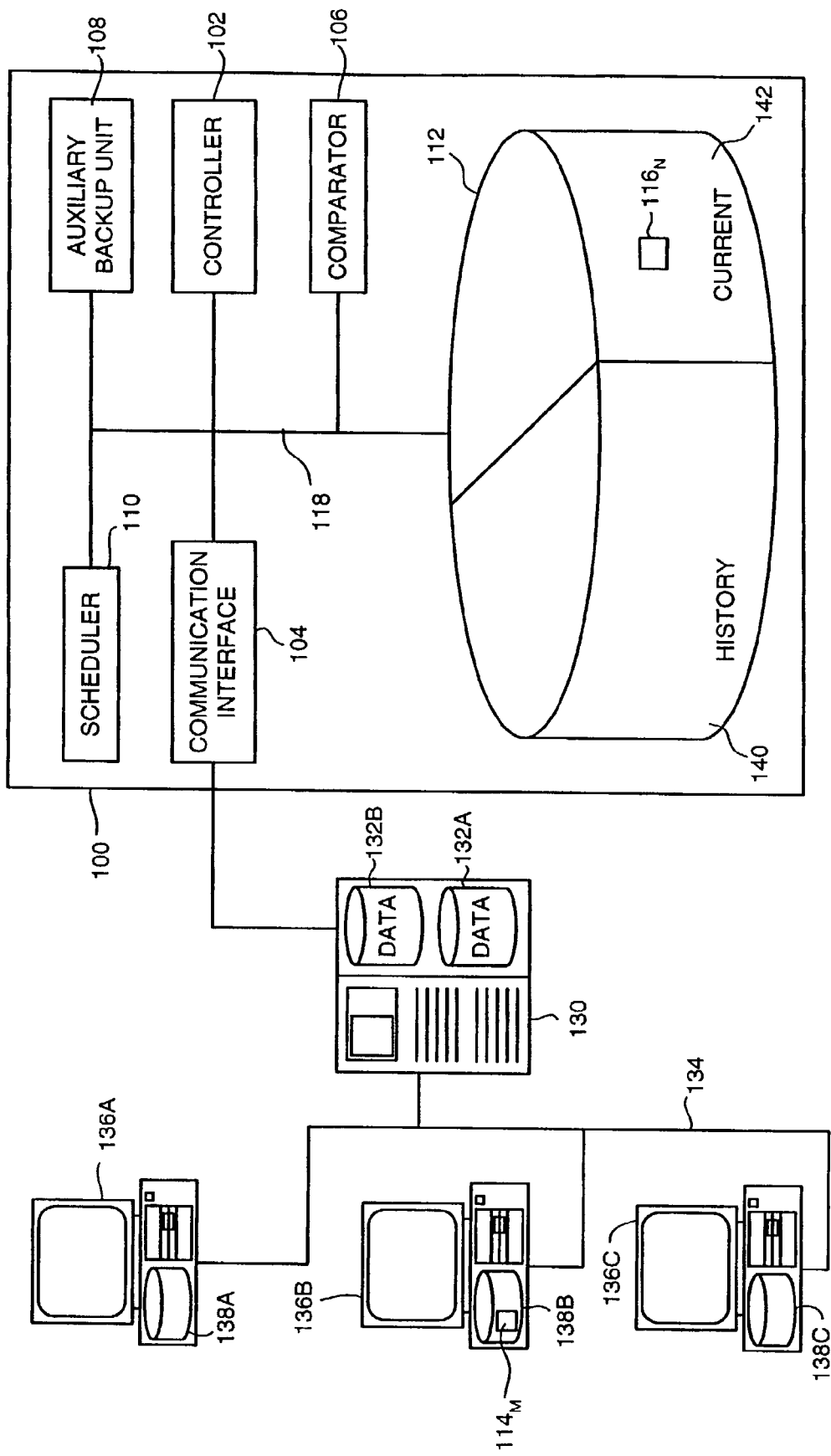
FIG. 2D is an illustration in detail of the backup system and portion of the computer network of FIG. 2A, at a further moment in time.
Figure 2E:
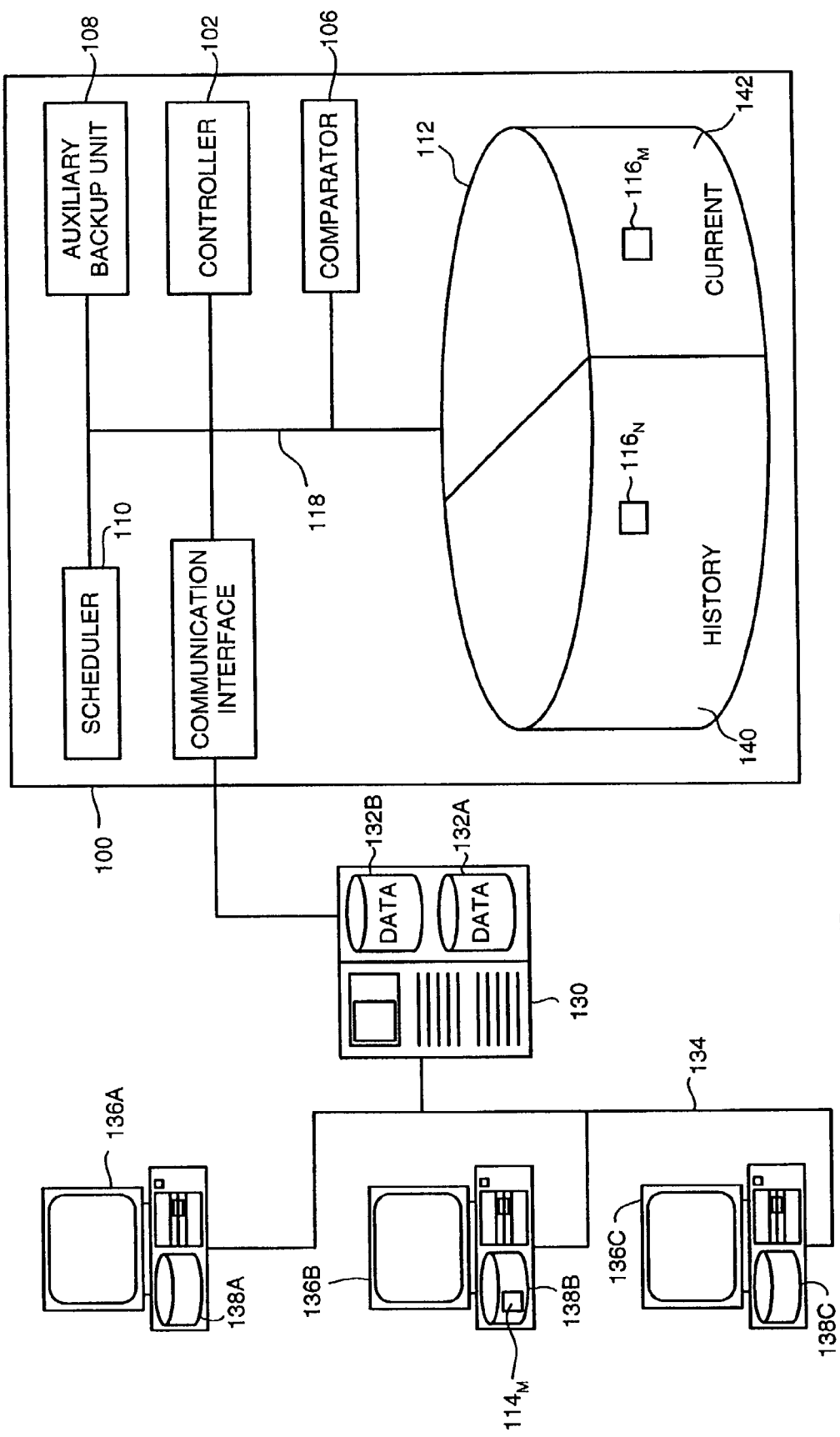
FIG. 2E is an illustration in detail of the backup system and portion of the computer network of FIG. 2A, at another moment in time.
Figure 2F:
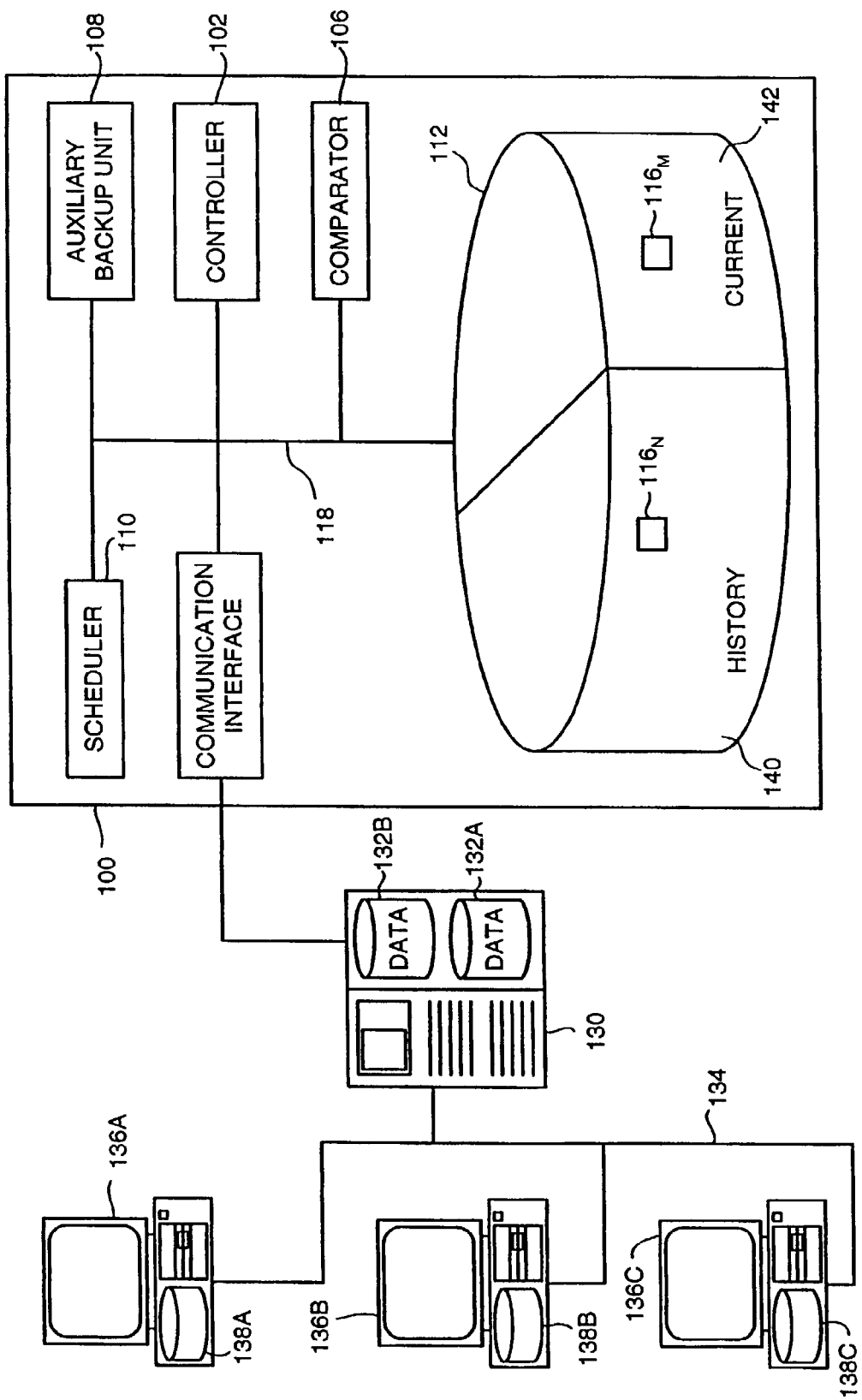
FIG. 2F is an illustration in detail of the backup system and portion of the computer network of FIG. 2A, at a further moment in time.
Figure 2G:
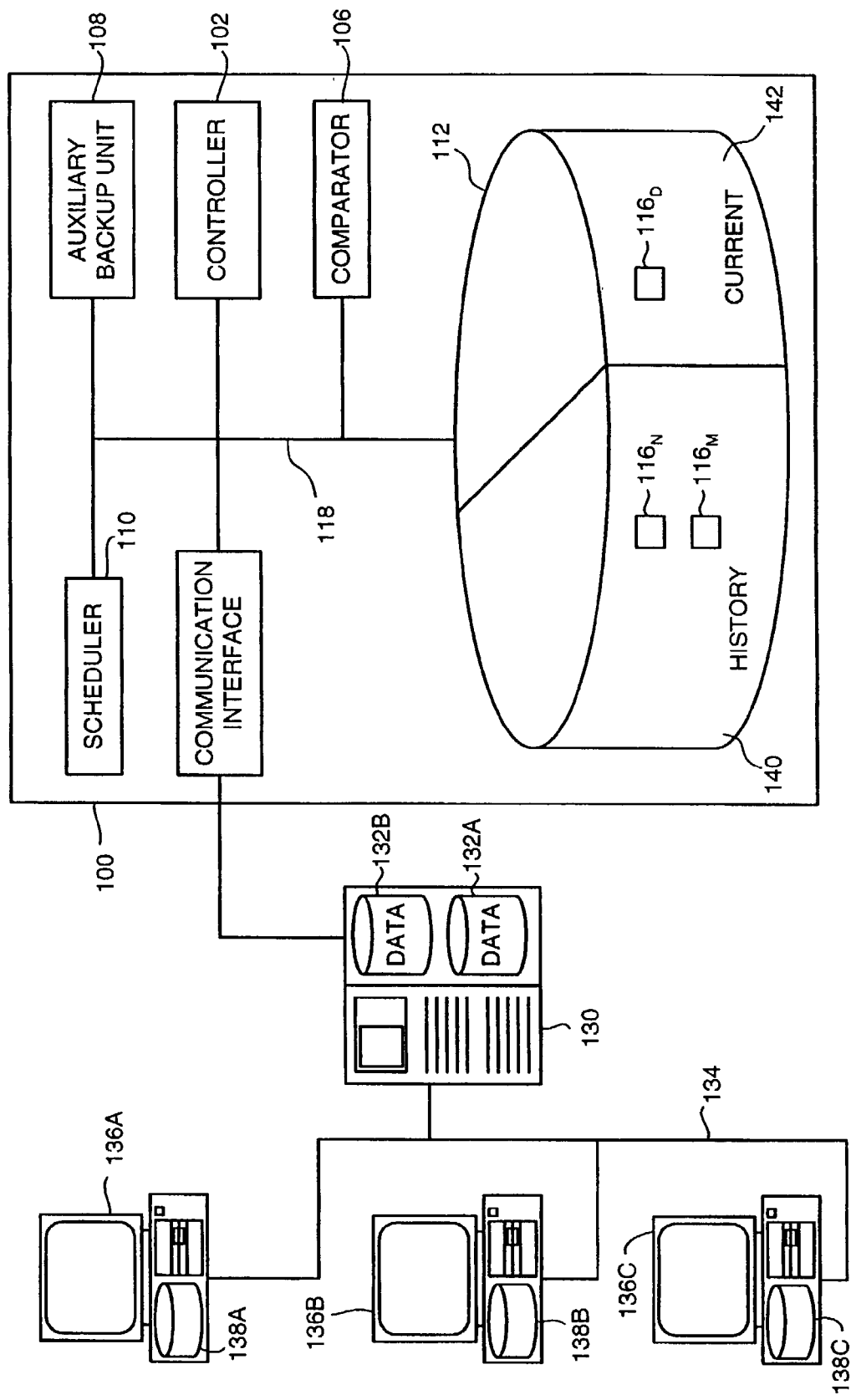
FIG. 2G is an illustration in detail of the backup system and portion of the computer network of FIG. 2A, at another moment in time.

Reference is further made to FIGS. 2B, 2C, 2D, 2E, 2F and 2G. FIG. 2B is an illustration in detail of backup system 100 and a portion of computer network 128 (FIG. 1), at one moment in time. FIG. 2C is an illustration in detail of the backup system and portion of the computer network of FIG. 2A, at another moment in time. FIG. 2D is an illustration in detail of the backup system 100 and portion of the computer network of FIG. 2A, at a further moment in time. FIG. 2E is an illustration in detail of the backup system and portion of the computer network of FIG. 2A, at another moment in time. FIG. 2F is an illustration in detail of the backup system and portion of the computer network of FIG. 2A, at a further moment in time. FIG. 2G is an illustration in detail of the backup system and portion of the computer network of FIG. 2A, at another moment in time.

With reference to FIG. 2B, a new basic data element $114_N$ is present in storage unit 138B. During a following backup session, comparator 106 detects that basic data element $114_N$ is present in storage unit 138B, but no respective backup element is present in storage unit 112. With reference to FIG. 2C, backup system 100 accordingly produces a backup version (i.e., a backup copy) $116_N$ of basic data element $114_N$ in the current-backup section 142 of storage unit 112.

With reference to FIG. 2D, at a later time, basic data element $114_N$ is modified, thereby producing a modified basic data element $114_M$. During a following backup session, comparator 106 detects a difference between basic data element $114_M$, and the last version thereof in storage unit 112, namely, backup version $116_N$. Accordingly, as shown in FIG. 2E, backup system 100 produces a backup version $116_M$ of basic data element $114_M$ in the current-backup section 142 of storage unit 112. Backup system 100 also moves backup version $116_N$ from current-backup section 142 to history-backup section 140.

With reference to FIG. 2F, at a still later time, basic data element $114_M$ is deleted. During a following backup session, comparator 106 detects that backup version $116_R$ is present in current-backup section 142, but no respective basic data element is present in storage unit 138B. With reference to FIG. 2G, backup system 100 produces a deleted-element indicator $116_D$ in current-backup section 142, which indicates that the data element $114_M$ has been deleted or is missing (i.e., moved from its previous location to a new location). Backup system 100 also moves backup version $116_M$ from current-backup section 142 to history-backup section 140. It is noted that during a backup session, backup system 100 may further rearrange and delete some of the stored backup versions.

It is further noted that the nature of the basic data elements, is determined according to the nature of the backed up data. For example, when the backed up data is a directory or a storage unit in a file system, then the respective basic data element is a single file, within this directory or storage unit. Similarly, when the backed up data is a database, then the respective basic data element is a single complete record, within this database (e.g., when the backed up data is an Email account, then the respective basic data element is a single Email message with all of the attachments thereof).

Figure 3:
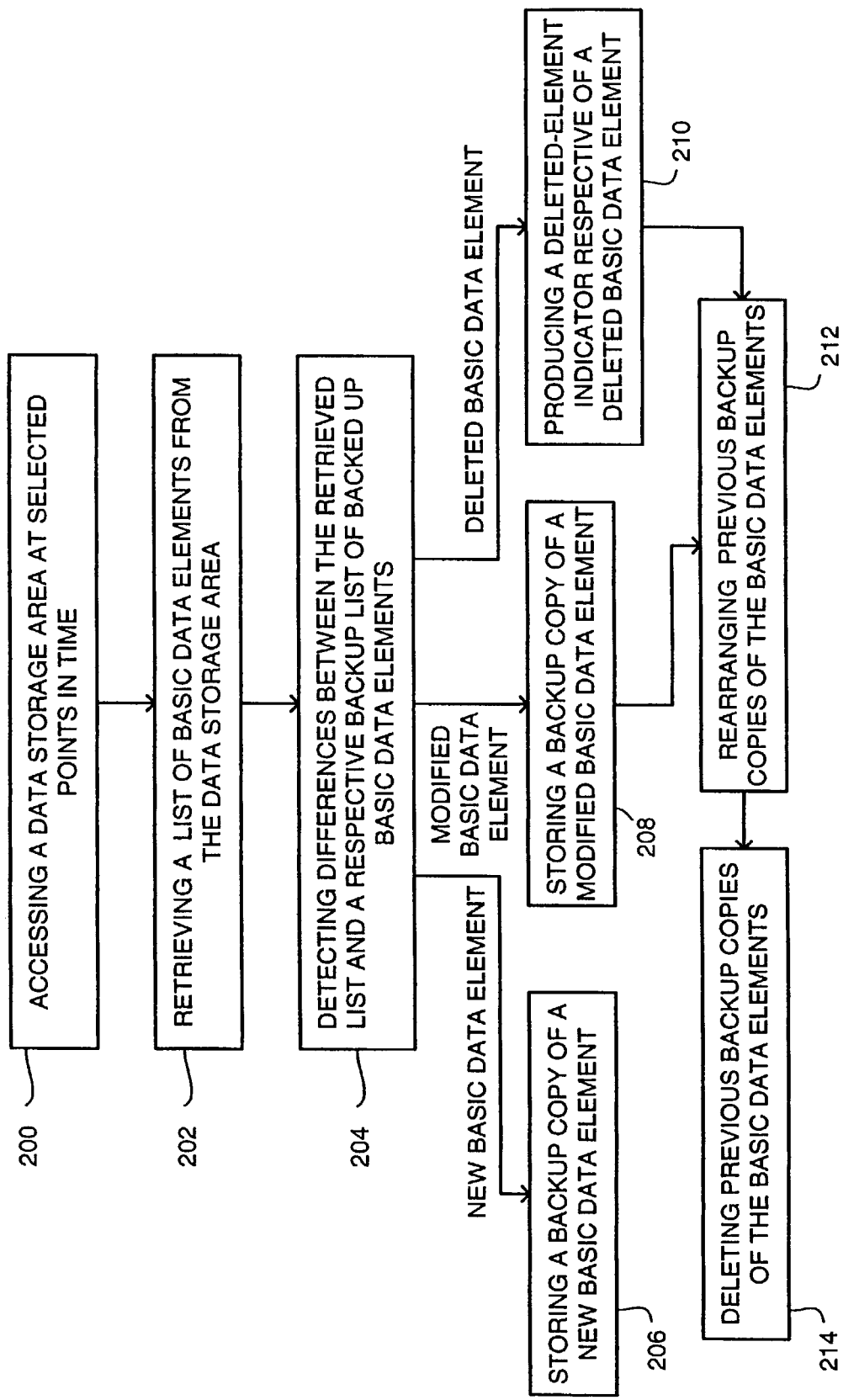
FIG. 3 is a schematic illustration of a method for operating the system of FIGS. 1 and 2, operative in accordance with another embodiment of the disclosed technique.

Reference is further made to FIG. 3, which is a schematic illustration of a method for operating system 100 of FIG. 1, operative in accordance with another embodiment of the disclosed technique. In procedure 200, a data storage area is accessed at selected points in time. In the example set forth in FIGS. 2B and 2C, backup system 100 accesses storage unit 138B. It is noted that the connection to this storage unit is made through server 130 and LAN 134. It is further noted that any storage unit on network 128 can be similarly accessed. For example, storage unit 152A of server 150 can be accessed through server 130 and WAN 140.

In procedure 202, a list of basic data elements is retrieved from the data storage area. Each entry of the retrieved list represents a basic data element from the data storage area. Each entry may include various properties of the respective basic data element, such as the name, the time and date last modified, the size, a pointer to the data element, and the like. Furthermore, the entry of the list may actually include the basic data element itself or a portion thereof. In the description that follows, a list is said to include a data element if the list includes an entry representing the data element. In the example set forth in FIG. 2B, controller 102 retrieves, via communication interface 104, a list including basic data element $114_N$.

In procedure 204, differences between the retrieved list and a respective backup list of backed up basic data elements, are detected. The backup list is retrieved from the storage unit of the backup system. The detected differences between the lists, may indicate that a change has occurred in the in the storage area, since the previous backup session. It is noted that differences in basic data elements can be detected using different properties of the data elements such as timestamp, size, archive bit, a combination thereof, and the like.

If the retrieved list includes a basic data element which is absent from the respective backup list, the backup system concludes that this basic data element has been created in the accessed storage area since the previous backup session, and applies procedure 206. It is noted that a basic data element is hereinafter said to be absent from a list, if there is no version of the basic data element included in the list. In the example set forth in FIG. 2B, comparator 106 detects that basic data element $114_N$ is present in storage unit 138B, but is absent from the respective backup list in storage unit 112.

If the retrieved list and the backed up list include different versions of the same basic data element, the backup system concludes that the basic data element from the retrieved list has been modified since the previous backup session, and applies procedure 208. In the example set forth in FIG. 2D, comparator 106 detects that basic data element $114_M$, is a modified version of backed up basic data element $116_N$.

If the backup list includes a basic data element which is absent from the retrieved list, the backup system concludes that the basic data element has been deleted from the respective storage area since the last backup session, and applies procedure 210. In the example set forth in FIG. 2F, comparator 106 detects that basic data element $114_N$ is present in storage unit 138B, but is absent from the respective backup list in storage unit 112. If none of the above cases apply, the backup system may store the information that no changes have occurred in the retrieved list between the previous and current backup sessions.

In procedure 206, a backup copy of a new basic data element is stored. In the example set forth in FIG. 2C, controller 102 stores backup copy $116_N$ of basic data element $114_N$ in storage unit 112. It is noted that a backup copy of a modified basic data element may be produced by copying the entirety of that basic data element onto the storage unit.

Alternatively, according to another aspect of the disclosed technique, the backup system may detect changes in specific sectors of a basic data element. Accordingly, when a small number of changed sectors are detected within a significantly large basic data element, traffic across the network is limited to the changed sectors only. The backup system copies the current-backup section version of that basic data element into the history-backup section, retrieves only the changed sectors from the source file and replaces therewith, the respective sectors in the current-backup section version of that basic data element.

In procedure 208, a backup copy of a modified basic data element is stored. In the example set forth in FIG. 2E, controller 102 stores backup copy $116_M$ of basic data element $114_N$ in storage unit 112. In procedure 210, a deleted-element indicator, respective of a deleted basic data element from the retrieved list, is produced. In the example set forth in FIG. 2G, controller 102 stores deleted-element indicator $116_D$ in storage unit 112.

It is noted that in a backup session, the respective one of procedures 206, 208 and 210, is applied for each basic data element change, which is detected in the storage area (i.e., a new data element appears, an existing data element is modified, or a data element is deleted). It is further noted that these procedures may be performed in different orders or in parallel.

In procedure 212, previous backup copies of the basic data elements are rearranged. For example, there may be a storage area allocated for the most recently produced version of a data element. Accordingly, when a new backup version is produced, the previous version is moved to another location in the backup storage unit. Other backup copies may also be rearranged, depending on the data structure in which they are stored. An example of such rearrangement shall be described in conjunction with FIGS. 5A, 5B, 5C, 5D, 5E and 5F.

In procedure 214, previous backup copies of the basic data elements are deleted. The backup system may have a predetermined limit on the storage space allocated for backup, on the number backup versions stored, on the number of days back to "remember" (i.e., the number of days back, from which to keep files), and the like. Hence, when one of these limits has been exceeded, the backup system deletes the oldest version. An example of a deletion procedure of backup versions shall be described in conjunction with FIGS. 10A, 10B, 10C. It is noted that the deletion procedure can be activated during the backup procedure or in a separate procedure at a determined time.

Figure 4:
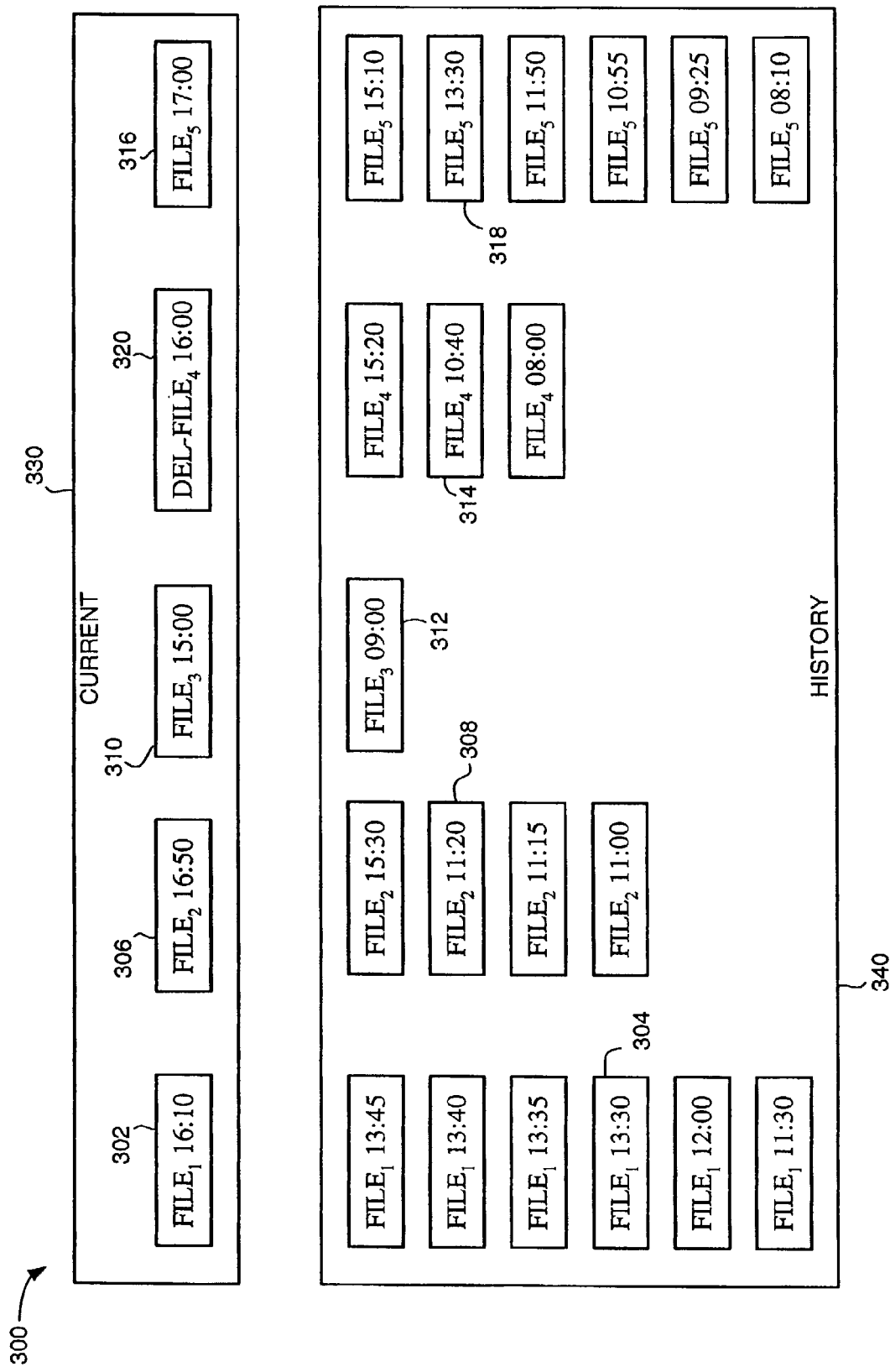
FIG. 4 is a schematic illustration of a backup portion, constructed and operative in accordance with a further embodiment of the disclosed technique.

Reference is now made to FIG. 4, which is a schematic illustration of a backup portion, generally referenced 300, constructed and operative in accordance with a further embodiment of the disclosed technique. Backup portion 300 is part of a storage unit (not shown) such as storage unit 112 (FIG. 2A). Backup portion 300 includes backup versions from a single backed up directory (not shown).

Backup portion 300 includes a current-backup portion 330 and a history-backup portion 340. Backup storage portion 300 includes the Current-backup portion 330 is part of a current-backup section such as current-backup section 142. Current-backup portion 330 includes the most recently stored file versions of the backed up directory. History-backup portion 340 is part of a current-backup section such as current-backup section 140. Current-backup portion 330 includes older file versions from the backed up directory.

The backed up directory included, at different points in time, five files, designated $FILE_1$, $FILE_2$, $FILE_3$, $FILE_4$ and $FILE_5$. The last file versions (present at 16:00) of $FILE_1$, $FILE_2$, $FILE_3$ and $FILE_5$, denoted 302, 306, 310 and 316, respectively, are stored in current-backup portion 330. The status of $FILE_4$ at 16:00 is "deleted".

In the present example, the backup system updates the backup storage unit every five minutes. When the backup system detects that a change has been made to a file, the system creates a copy of the new file version in current-backup portion 330. The system further stores a copy of the previous file version in history-backup portion 340, with additional data such as the time of modification. Such a change can consist of modifying a file, deleting a file or adding a file. For example, $FILE_1$ was created at 11:30, modified at 12:00, 13:30, 13:35, 13:40, 13:45 and the last version is still unchanged at 16:00. $FILE_4$ was created at 08:00, modified at 10:40 and deleted at 15:20.

Current-backup portion 330 includes all the files of the backed up directory, as it was during the last backup session. Similarly, the current-backup section according to the disclosed technique, includes all the data elements of the entire backed up network, computer, and the like. It is noted that if a storage unit of the network (e.g., a computer, a directory) is corrupted or destroyed, then this storage unit may be restored by simply copying the current-backup section, or the respective portion thereof, onto that storage unit or a replacement storage unit. It is noted that since basic data elements and storage areas, are stored in their entirety in the current-backup section, these basic data elements and storage areas may be restored with minimal computing resources, time and human labor required. A simple copy operation (e.g., cut and paste or drag and drop, user interface operations) from the current-backup section to the original storage area, is all that is required for full restoration of that area.

It is further noted that holding frequent backup sessions reduces the amount of data traffic over communication lines between the backup system and the backed up nodes, with respect to full backup sessions. Thus, the backup data traffic can spread among the different backup sessions, thereby reducing the network load that would otherwise be created during less frequent backup sessions.

In the embodiment disclosed above, wherein the backup system copies the entirety of a basic data element from the source location, the backup system does not analyze the backed up basic data elements during backup (i.e., they are copied in full, if modified), then the computing resources required for each backup session are minimal.

Figure 5A:
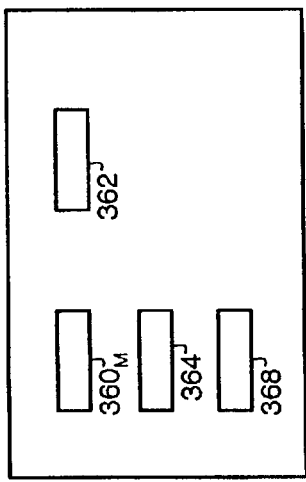
FIG. 5A is a schematic illustration of a storage area at a first moment in time.
Figure 5B:
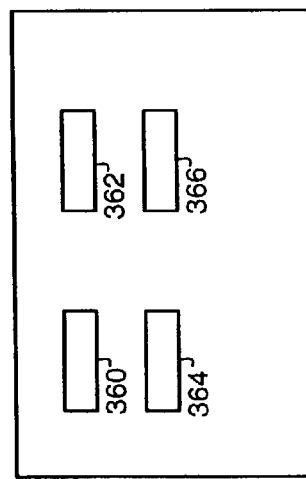
FIG. 5B is a schematic illustration of the storage area of FIG. 5A at a later moment in time.
Figure 5C:
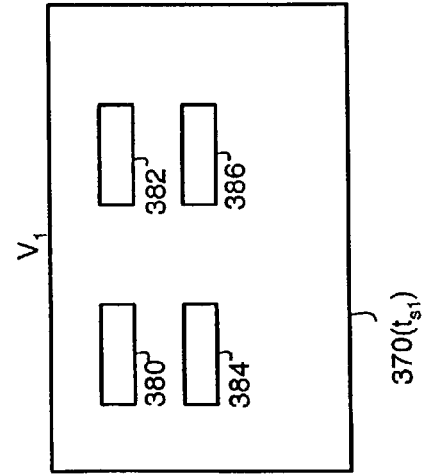
FIG. 5C is a schematic illustration of a backup storage area, constructed and operative in accordance with another embodiment of the disclosed technique, which backs up the storage area of FIG. 5A at another moment in time.
Figure 5D:
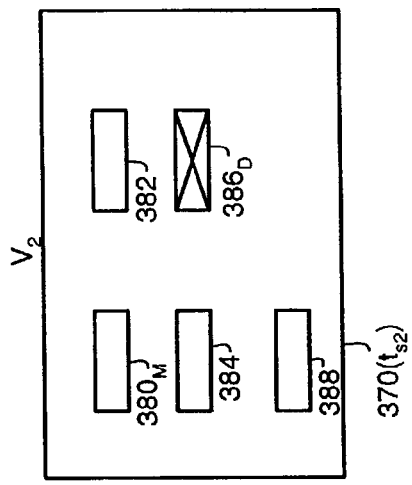
FIG. 5D is a schematic illustration of the backup storage area of FIG. 5C at a further moment in time.
Figure 5E:
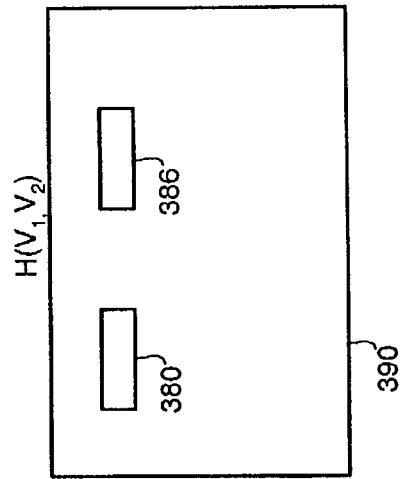
FIG. 5E is a schematic illustration of a history-data-portion, constructed and operative in accordance with a further embodiment of the disclosed technique.

Reference is now made to FIGS. 5A, 5B, 5C, 5D and 5E. FIG. 5A is a schematic illustration of a storage area 350 at a first moment in time $t_1$. FIG. 5B is a schematic illustration of storage area 350 at a later moment in time $t_2$. FIG. 5C is a schematic illustration of a backup storage area 370, constructed and operative in accordance with another embodiment of the disclosed technique, which backs up storage area 350 at another moment in time $t_{s3}$. FIG. 5D is a schematic illustration of backup storage area 370 at a further moment in time $t_{s2}$. It is noted that $t_1 < t_{s1} < t_2 < t_{s2}$. FIG. 5E is a schematic illustration of a history-data-portion 390, constructed and operative in accordance with a further embodiment of the disclosed technique.

At time $t_1$ (FIG. 5A), storage area 350 includes basic data elements 360, 362, 364 and 366. At time $t_2$ (FIG. 5B), storage area 350 includes basic data elements 362 and 364, a new basic data element 368, and a basic data element $360_M$, which is a modified version of basic data element 360 of FIG. 5A. At time $t_{s1}$, storage area 350 is accessed for the first time. The backup system stores a full backup version of this storage area, in backup storage area 370, and denotes this version $V_1$. Backup storage area 370 includes, at this time, basic data elements 380, 382, 384 and 386, which are backup copies of basic data elements 360, 362, 364 and 366, respectively.

At time $t_{s2}$, storage area 350 is again accessed. The backup system updates storage area 370 according to the detected changes in storage area 350. Accordingly, at time $t_{s2}$, backup storage area 370 includes basic data elements $380_M$, 382, 384 and 388, which are backup copies of basic data elements $360_M$, 362, 364 and 368, respectively. Backup storage area 370 further includes, at time $t_{s2}$, a deleted-element indicator $386_D$, which indicates that basic data element 366, has been deleted from storage area 350.

At this time $t_{s2}$, the backup system further produces history-data-portion 390 (FIG. 5E), according to the detected changes. History-data-portion 390 includes basic data elements 380 and 386. History-data-portion 390 is produced in order to enable restoration of the deleted and modified data.

Figure 5F:
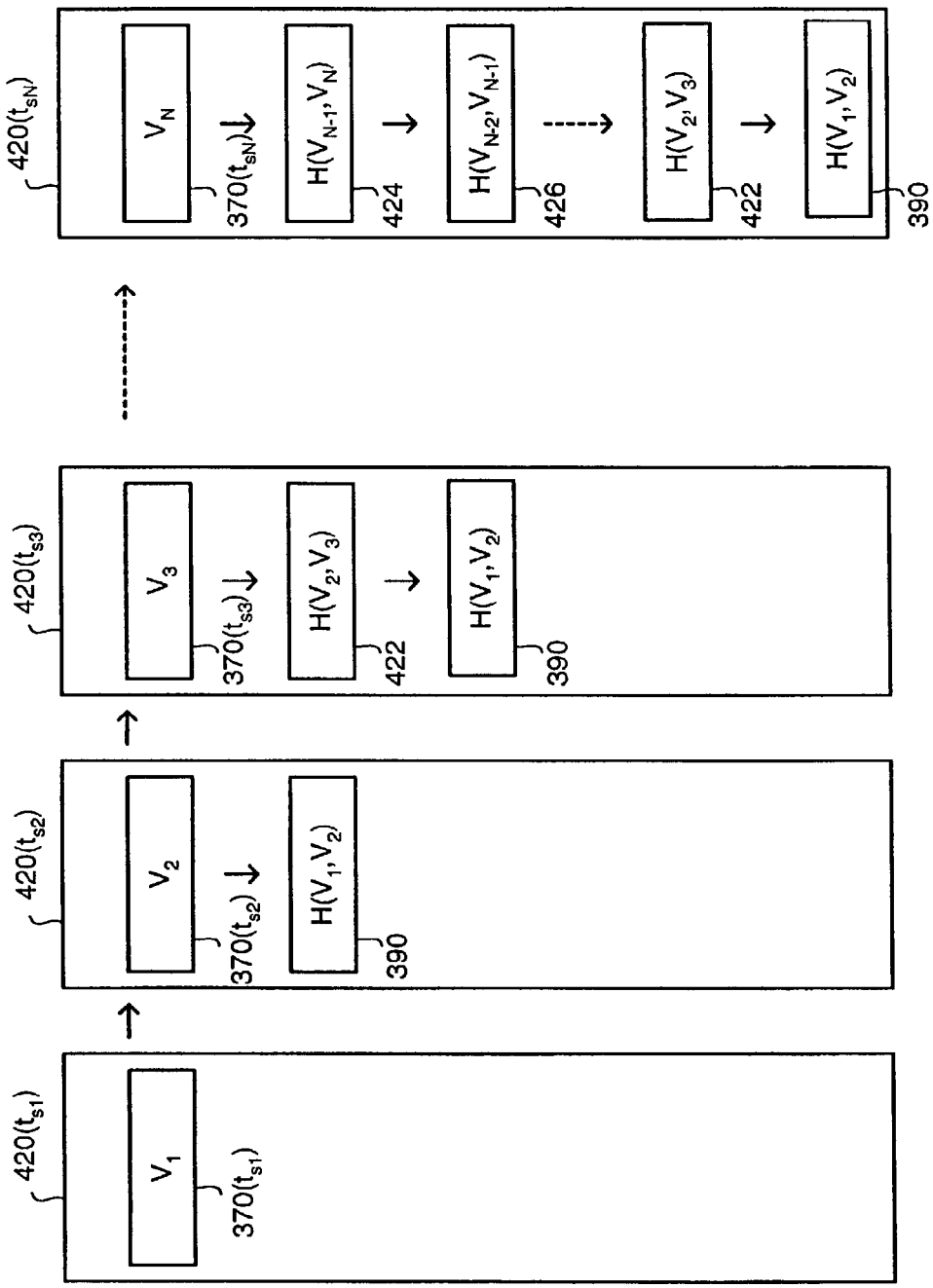
FIG. 5F is a schematic illustration of different instances of a backup data structure at four different times.

Reference is further made to FIG. 5F, which is a schematic illustration of different instances of a backup data structure 420 at times $t_{s1}$, $t_{s2}$, $t_{s3}$ and $t_{sN}$. Backup data structure 420 includes, at all times, backup storage area 370 (FIGS. 5C and 5D). At time $t_{s2}$, backup data structure 420 further includes history-data-portion 390 (FIG. 5E). At time $t_{s3}$, backup data structure further includes history-data-portion 390 and another history-data-portion 422. At time $t_{sN}$, backup data structure 420 further includes history-data-portions 390, 422, 424 and 426.

History-data-portions 422, 424 and 426 are generally similar to history-data-portion 390. In general, a history-data-portion includes versions of basic data elements which would otherwise be lost, when a storage area backup version is updated. For example, with reference to FIGS. 5C and 5D, the backup system updates backup version $V_1$, thereby producing backup version $V_2$. The pre-modified version of basic data element 380 (FIG. 5C) and the pre-deleted version of basic data element 386 are included in history-data-portion 390, also denoted $H(V_1, V_2)$.

Similarly, at time $t_{s3}$, backup version $V_2$ is updated, thereby producing backup version $V_3$. Accordingly, history-data-portion $H(V_2, V_3)$ (referenced 422), is stored in data structure 420. In general, the backup versions $V_i$ (i being a positive integer), and the history-data-portions $H(V_i, V_{i+1})$, are stored in data structure 420 in a hierarchical structure illustrated in FIG. 5F. The top level always includes a full backup version $V_k$ (k being a positive integer) of the backed up storage area. The next level includes a history-data-portion $H(V_k, V_{k-1})$, associated with the version $V_k$ and the previous version $V_{k-1}$ (provided that a previous version is available). The next level includes a history-data-portion $H(V_{k-1}, V_{k-2})$, and so on.

According to the present example, every backup version $V_k$ can be restored using the subsequent version $V_{k+1}$ and the history-data-portion $H(V_k, V_{k+1})$. It is noted that the system may restore the backup version using the basic data elements $V_{k+1}$ and $H(V_k, V_{k+1})$, using deleted-element indicators, using other available data such as the time at which certain basic data elements were produced, and the like. The most recent backup version of a backed up storage area is always directly available for the user. When the user requests a previous version, the backup system can produce this version, by beginning with the most recent version, and using each history-data-portion to produce a previous version.

It is noted that a backup system according to the disclosed technique, can be used to backup data across a network such as network 128 (FIG. 1) or be dedicated to backup a specific device such as the server 130, which is coupled therewith. Furthermore, the backup system can be external to server 130 or incorporated therein.

Figure 6A:
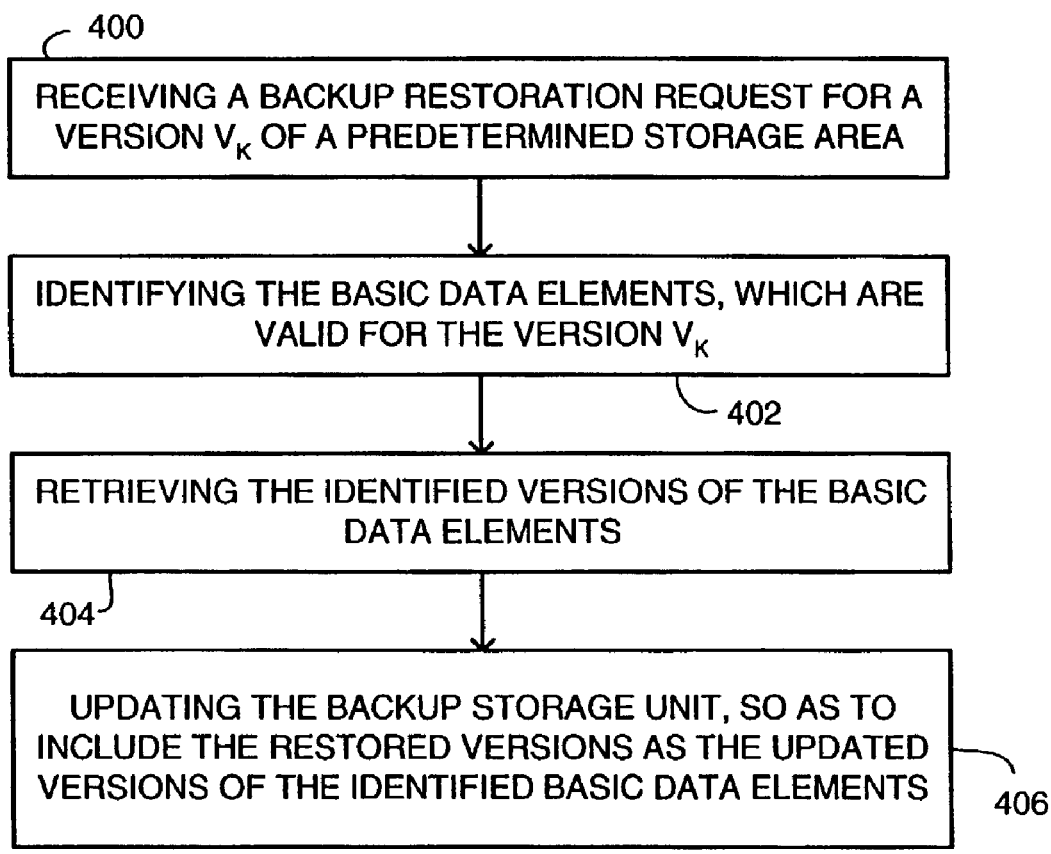
FIG. 6A is a schematic illustration of a method for restoring data from a specific storage area, operative in accordance with another embodiment of the disclosed technique.

Reference is now made to FIG. 6A, which is a schematic illustration of a method for restoring data from a specific storage area, operative in accordance with another embodiment of the disclosed technique. It is noted that the method of FIG. 6A is intended to restore an instance of a storage area (e.g., a directory), as it was at a selected point in time. In order to restore a single data element (e.g., a file), the user may apply the method of FIG. 6A, and then retrieve the requested data element from the restored storage area.

In procedure 400, the backup system receives a restoration request for a version $V_K$ of a specified storage area. With reference to FIG. 4, the storage area includes directory 300. For example, the request may include the version $V_K$, characterized by a restoration time of 13:30.

In procedure 402, the basic data elements which are valid for the version $V_K$, are identified. The backup system identifies all of the basic data elements, which were valid for that version $V_K$. In the present example, these basic data elements include all of the file versions, which were present at 13:30. These elements include file versions $FILE_1$ 13:30, $FILE_2$ 11:20, $FILE_3$ 09:00, $FILE_4$ 10:40 and $FILE_5$ 13:30, referenced 304, 308, 314 and 318, respectively.

In procedure 404, the identified versions of the basic data elements, are retrieved. In procedure 406, the backup storage unit is updated, so as to include the restored versions as the updated versions of the identified data elements.

Figure 6B:
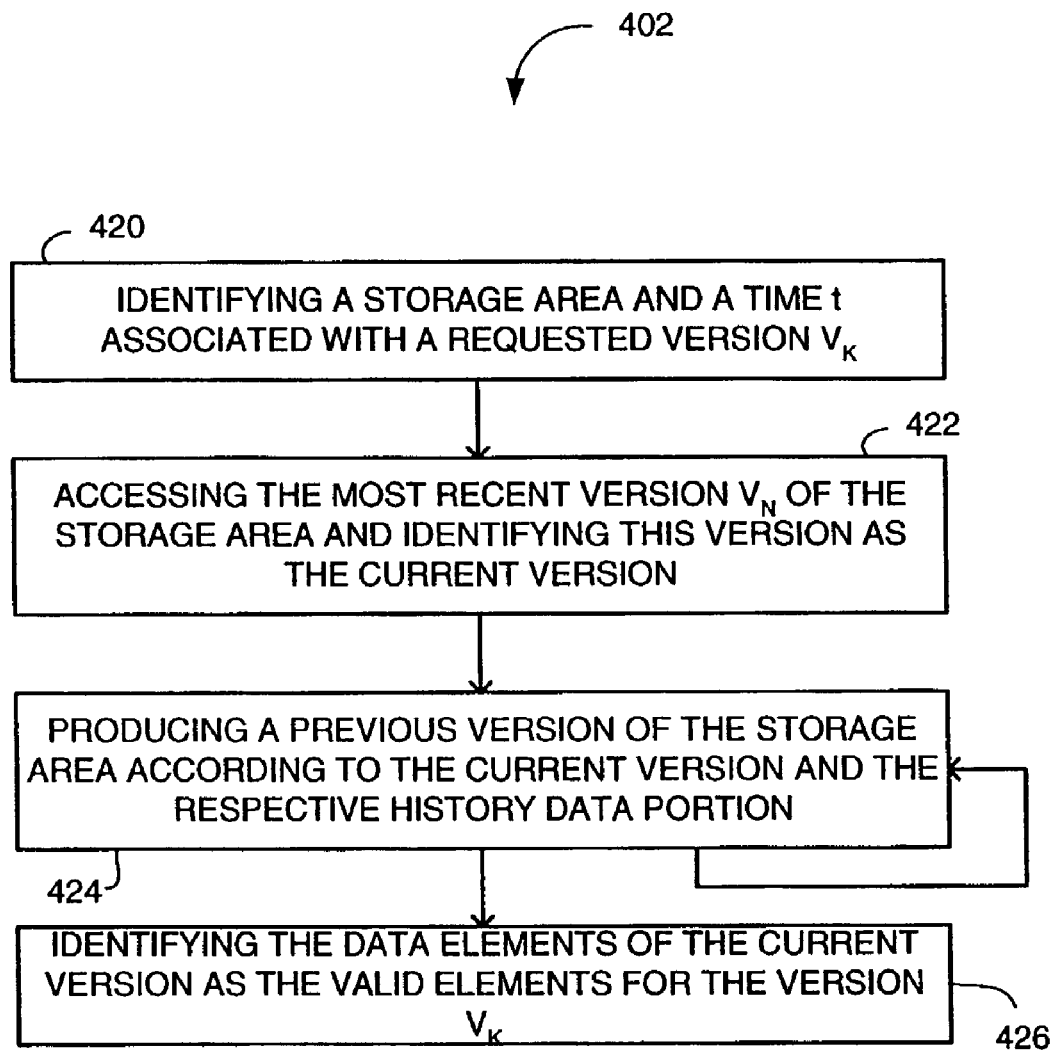
FIG. 6B is an illustration in detail of the identification procedure of the method of FIG. 6A, operative in accordance with a further embodiment of the disclosed technique.

Reference is further made to FIG. 6B, which is an illustration in detail of procedure 402 of the method of FIG. 6A, operative in accordance with another embodiment of the disclosed technique.

In procedure 420, a storage area and a time t associated with a requested version $V_K$, are identified. For example, with reference to FIGS. 5A, 5B, 5C, 5D, 5E and 5F, the version $V_1$, characterized by a time $t_{s1}$, may be requested.

In procedure 422, the most recent version $V_N$ of the storage area is accessed and identified as the current version. For example if the request is made at a time $t_2$, the current version is $V_2$.

In procedure 424, a previous version of the storage area is produced according to the current version and the respective history-data-portion. It is noted that procedure 424 may be applied a plurality of times. For example, the user may request version $V_3$ when the current version is $V_5$. Accordingly, the system first produces version $V_4$ according to version $V_5$ and history data $H(V_4, V_5)$, and then produces version $V_3$ according to version $V_4$ and history data $H(V_3, V_4)$. In procedure 426, the data elements of the current version are identified as the valid elements for the version $V_K$.

Reference is now made to FIG. 6C, which is an illustration in detail of procedure 424 of the method of FIG. 6B, operative in accordance with another embodiment of the disclosed technique.

In procedure 440, a list of basic data elements from a current version and a list of elements from a respective history-data-portion, are accessed. For example, the system accesses version $V_2$ (FIG. 5E) and history-data-portion $H(V_1, V_2)$ (FIG. 5F), in order to produce version $V_1$.

In procedure 442, basic data elements created after the requested version time t, are discarded. It is noted that the creation time of a basic data element refers to the time at which the original version thereof was created. In the present example, version $V_1$ is characterized by a version time $t_1$. Hence, basic data element 388 (FIG. 5D), whose original version created after time $t_1$, is discarded.

In procedure 444, modified elements are replaced with respective pre-modified elements. In the present example, modified basic data elements $380_M$ (FIG. 5D) is replaced with the pre-modified version thereof 380 (FIG. 5E).

In procedure 446, deleted-element indicators are replaced with respective pre-deleted elements. In the present example, deleted-element indicator $386_D$ (FIG. 5D) is replaced with the pre-deleted version 384 (FIG. 5E).

In procedure 448, the resulting list of data elements is identified as the previous version. With reference to FIG. 5E, the resulting list of includes basic data elements 380, 382, 384 and 386 (i.e., it is equivalent to backup version $V_1$ of FIG. 5C).

According to another aspect of the disclosed technique, the backup system includes a database, storing data respective of backed up data elements. This database facilitates in accessing the backup data elements.

Figure 7:
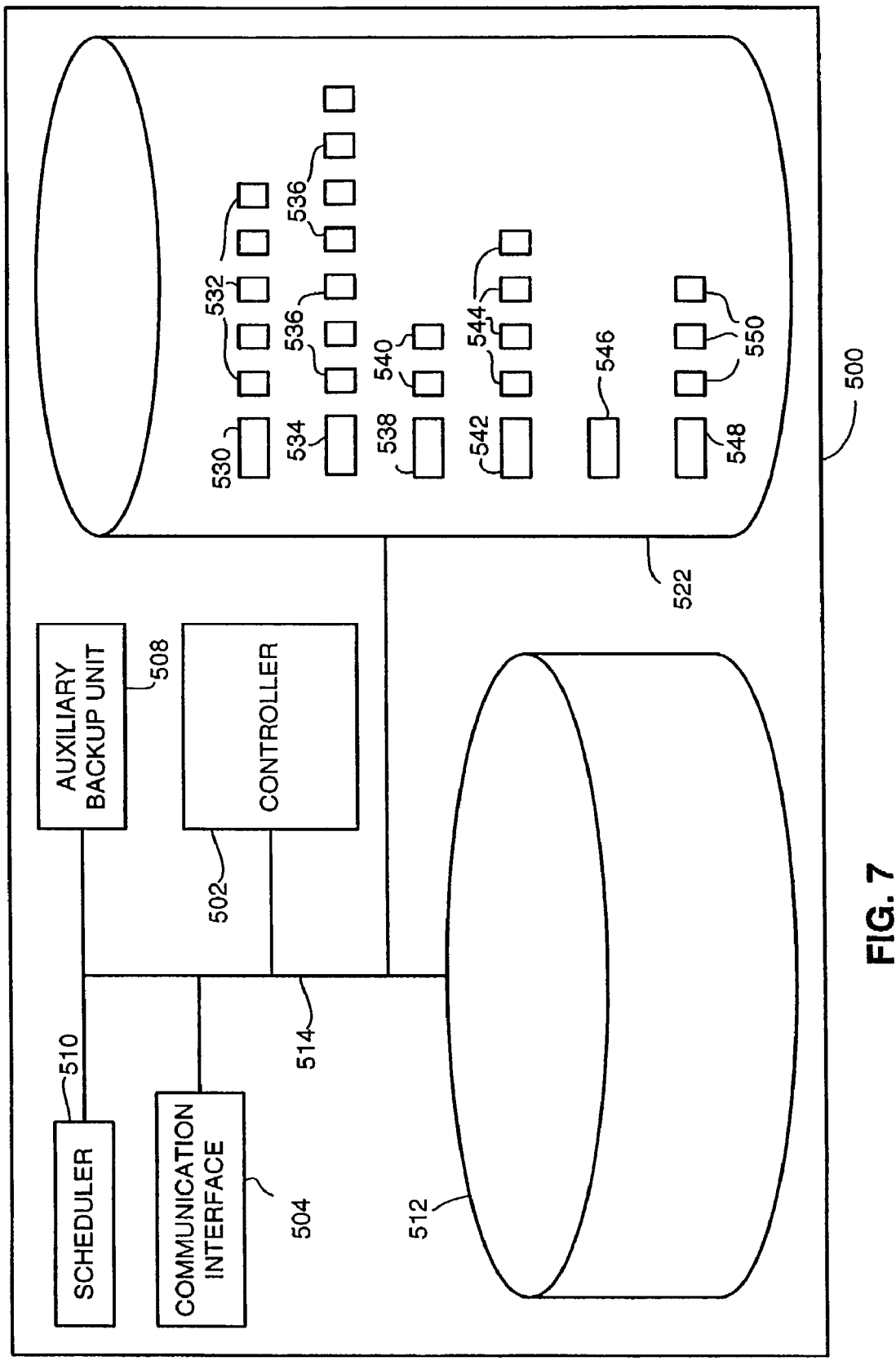
FIG. 7 is a schematic illustration of a backup system, constructed and operative in accordance with a further embodiment of the disclosed technique.

Reference is now made to FIG. 7, which is a schematic illustration of a backup system, generally referenced 500, constructed and operative in accordance with a further embodiment of the disclosed technique. Backup system 500 includes a controller 502, a communication interface 504, a backup storage unit 512, an auxiliary backup unit 508, a scheduler 510 and a database storage unit 522. Controller 502, communication interface 504, backup storage unit 512, auxiliary backup unit 508, scheduler 510 and database storage unit 522 are all coupled there between via a local bus 514. Controller 502, communication interface 504, backup storage unit 512, auxiliary backup unit 508, scheduler 510 and database storage unit 522 are generally similar to controller 102, scheduler 110, communication interface 104, auxiliary backup unit 108, comparator 106 and storage unit 112 of backup system 100 (FIG. 1), respectively. Database storage unit 522 includes a plurality of records, which include information regarding the backup storage areas and history-data-portions, stored within storage unit 512.

For example, database record 530 includes a pointer to a backup version of a storage area and the associated records 532 are pointers to history-data-portions, which are associated with the backup storage area. Similarly, database records 534, 538, 542 and 548 include pointers to backup storage areas and database records 536, 540, 544 and 550 include respective pointers to history-data-portions. Database record 546 includes a pointer to a backup storage area. Being the only backup item for its related storage area, database record 546 does not have respective pointers to associated history-data-portions. It is noted that database 522 may, alternatively or additionally, include pointers to basic data element backup versions from the current and history backup sections.

Each of the database records of database storage unit 522 includes various data, regarding the respective backup items. According to this aspect of the disclosed technique, a user can access the database storage unit 522 so as to review the restoration options which are available. The user does not have to access the backup storage unit 512 for this purpose.

Figure 8A:
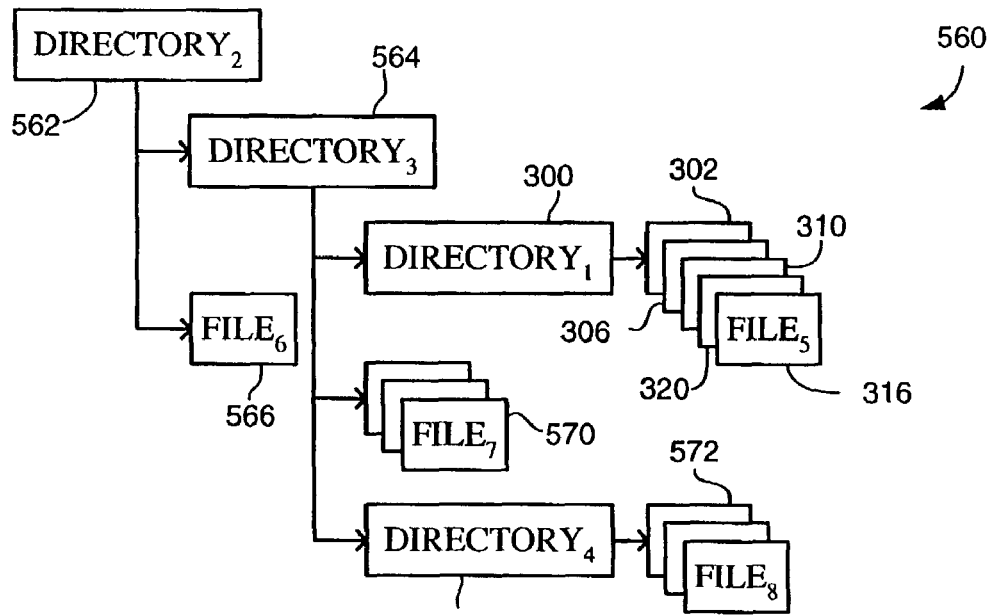
FIG. 8A is a schematic illustration of a current-backup section, constructed and operative in accordance with another embodiment of the disclosed technique.
Figure 8B:
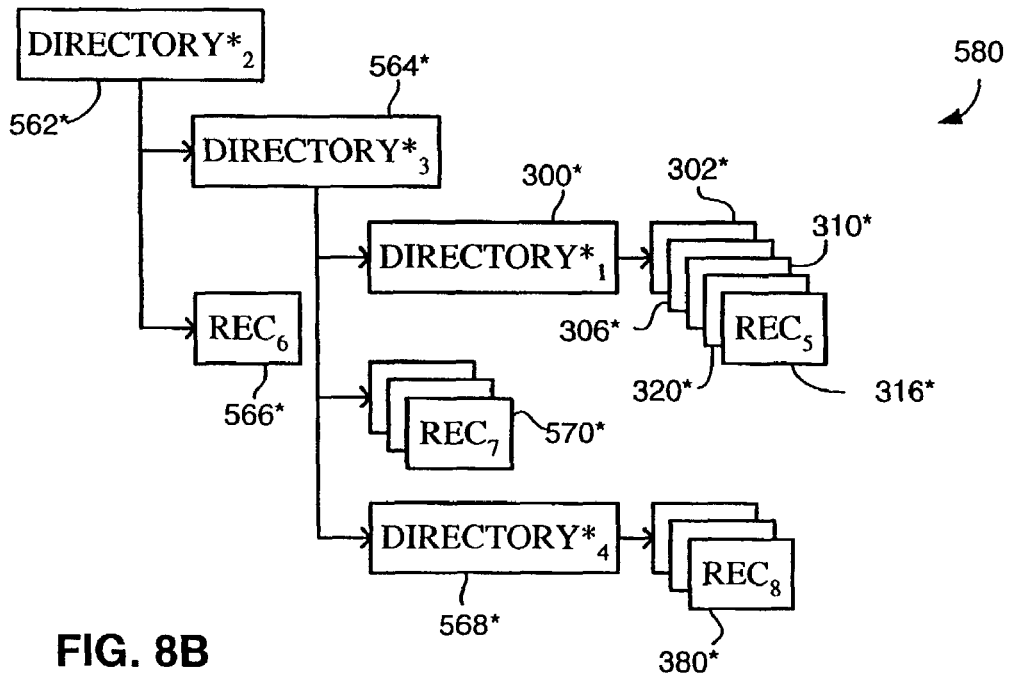
FIG. 8B is a schematic illustration of a backup database, constructed and operative in accordance with a further embodiment of the disclosed technique.

Reference is now made to FIGS. 8A and 8B. FIG. 8A is a schematic illustration of a current-backup section, generally referenced 560, constructed and operative in accordance with another embodiment of the disclosed technique. FIG. 8B is a schematic illustration of a backup database, constructed and operative in accordance with a further embodiment of the disclosed technique.

The current-backup section provides access to the most recent backed up versions of the storage area. The structure of current-backup section 560 is similar to the backed up data and includes a hierarchical structure. Current-backup section 560 includes a root directory 562. Directory 562 includes a sub-directory 564 and the current version of a file 566. The sub-directory 564 includes two sub-directories 300 (FIG. 4) and 568 and the current version of a plurality of files, generally designated 570. The sub-directory 300 includes the current version of files 302, 306, 310, 320 and 316, where the current version of file 320 includes a deleted-file indicator respective of that file. Directory 568 includes the current version of a plurality of files, generally designated 572.

The backup database provides access to the recent backup versions, as well as previous backup versions. The structure of backup database 580 is identical to that of the current-backup section and hence, includes a hierarchical structure, where the items are denoted with a "*". Backup database 580 includes a root directory 562*. In the present example, directory 562* includes a sub-directory 564* and the file records 566* of file 566. These file records include pointers to the location of file 566 within the backup system. The sub-directory 564* includes two sub-directories 300* and 568* and a plurality of file records, generally designated 570*, which relate to the various versions of files 570. The sub-directory 300* includes a plurality file record groups. The groups are designated 302*, 306*, 310*, 320* and 316*, respective of each of the files 302, 306, 310, 320 and 316. Each of the groups includes a plurality of file records, which point to the backup versions of a selected file. It is noted that group 320* includes a pointer to the various backup versions of file 568 as well as to the "deleted" indication of that file within the current-backup section.

Figure 9A:
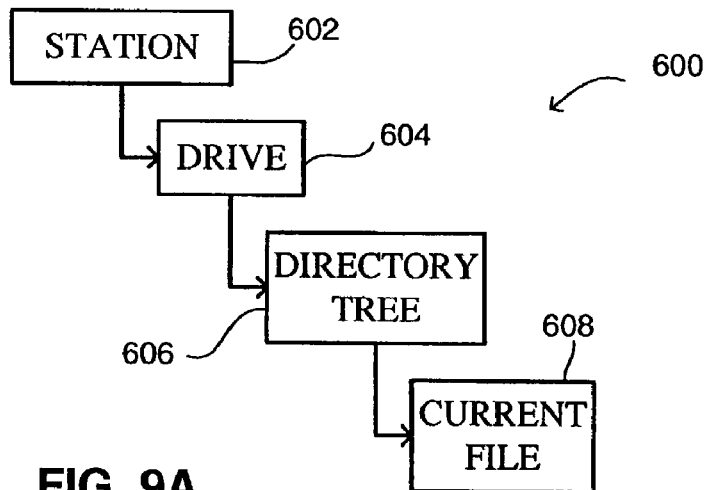
FIG. 9A is a schematic illustration of a physical path within a current-backup section, constructed and operative in accordance with another embodiment of the disclosed technique.
Figure 9B:
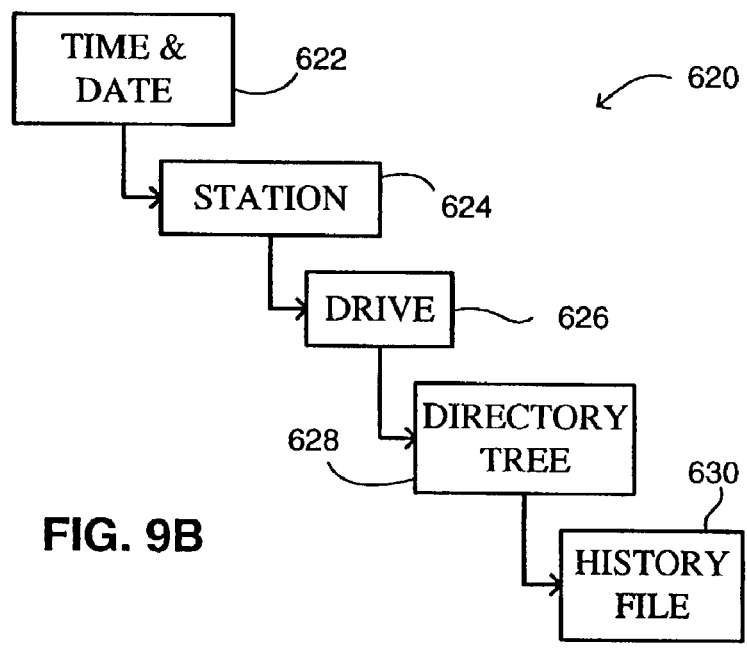
FIG. 9B is a schematic illustration of a physical path within a history-backup section, constructed and operative in accordance with a further embodiment of the disclosed technique.
Figure 9C:
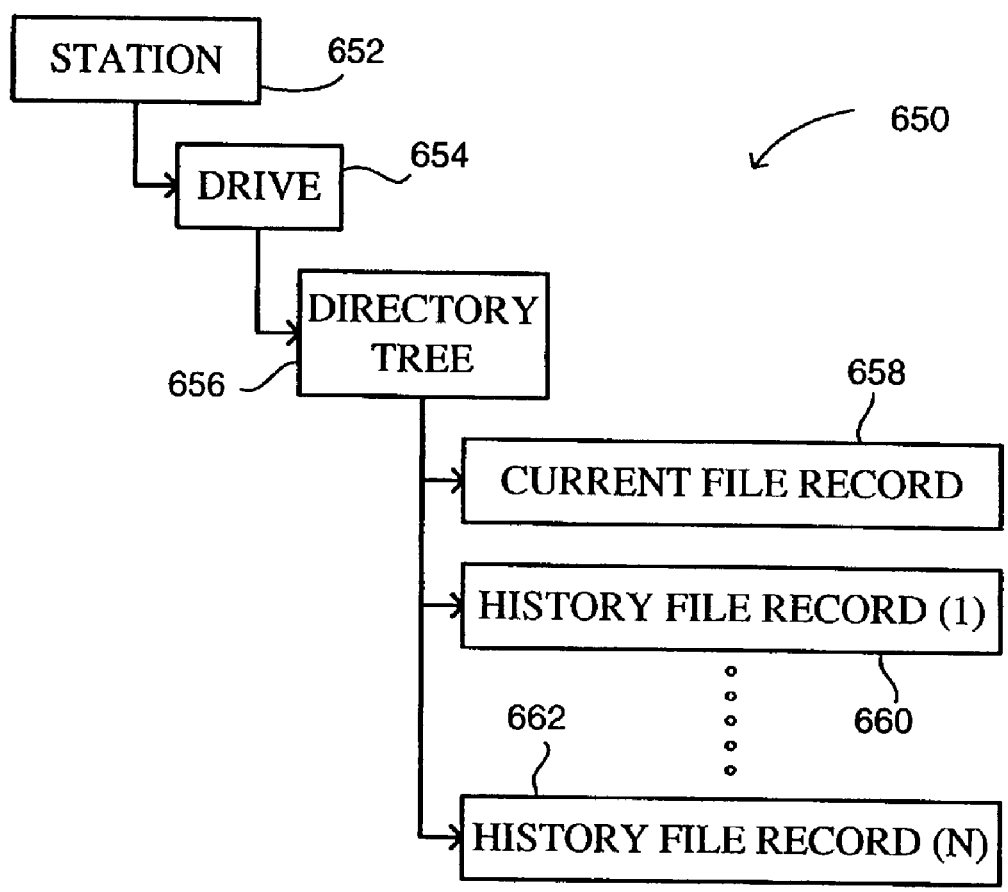
FIG. 9C is a schematic illustration of a physical path within a backup database, constructed and operative in accordance with another embodiment of the disclosed technique.

Reference is now made to FIGS. 9A, 9B and 9C. FIG. 9A is a schematic illustration of a physical path, generally referenced 600, within a current-backup section, constructed and operative in accordance with another embodiment of the disclosed technique. FIG. 9B is a schematic illustration of a physical path, generally referenced 620, within a history-backup section, constructed and operative in accordance with a further embodiment of the disclosed technique. FIG. 9C is a schematic illustration of a physical path, generally referenced 650, within a backup database, constructed and operative in accordance with another embodiment of the disclosed technique.

With reference to FIG. 9A, the current-backup path includes a plurality of levels. The initial level includes a directory 602, respective of a specified backed up node (e.g., station, server, storage device). The next level includes a directory 604, respective of a backed up drive or volume, within station 602. The next level includes a directory structure 606, which copies the directory structure where a backed up file is located. The final level includes a copy 608 of the current version of that backed up file.

It is noted that when a file is deleted, the backup system of the disclosed technique moves the current stored version of that file to the history-backup section and creates zero-size file within the current-backup section, having a name which includes the name of the deleted file together with an indication that that file was deleted. For example, for a deleted file with the name "test.doc", the system can create a zero-size file named "deleted-test.doc". File "deleted-test.doc" is essentially a pointer to at least the most recent previous version of the original object in the historical archives area. It is noted that according to the disclosed technique, the system can recognize and restore deleted data elements with no need for searching and at negligible computing time.

With reference to FIG. 9B, the history-backup section provides access to previous backup versions of a storage area, from a specified time and date. The path to a backup version in the history-backup section, is similar to the path to the respective recent version in the current-backup section, but with an addition of an initial level. The initial level includes a primary directory 622, having a name, respective of a time stamp, associated with the history version.

The rest of the levels include station 624, drive 626 and directory tree 628, all respective of the structure set forth in FIG. 9A. The final level includes a copy 630 of the backed up file, as it was at the time and date denoted at the initial level 622.

With reference to FIG. 9C, the directory structure of the backup database is similar to that of the current-backup section, starting with a station 652 level, a drive 654 level and a directory tree 656 level. The final level includes a plurality of records. Each of the records relates to a specific version of a backed up file.

The first record 658 relates to the current copy 608 of the backed up file (FIG. 9A). This record includes the location of that copy 608, and may further include various data relating to that version, such as the version date and time. The rest of the records 660 and 662 relate to history versions of the backed up file. In the present example, record 660 is related to history version 630 (FIG. 9B). Each of these records includes a pointer to the history version, and may further include various data relating to that history version, such as the version date and time.

Hence, according to the disclosed technique, the information relating to the location of a version is located outside the record, respective of that version. It is noted that this structure provides a significant reduction of size of the database with respect to prior art backup system databases, by a factor of over 90%. Furthermore, the structure is managed from within the operating system, thereby significantly increasing the access speed to the database records as well as the backup versions. It is further noted that if, for some reason, the database is corrupted, a new version thereof can be restored from the structure of the backup records stored within the current and history-backup sections.

According to the disclosed technique, the number of versions of a given data element, which the backup system stores, is limited only by the storage capacity of the backup storage unit. However, the user of the backup system can predetermine rules, according to which certain versions of data elements or storage areas, are processed out of the backup storage unit. For example, the system may store at most 30 versions of each data element. Accordingly, when the $31^{st}$ backup version of a data element is produced, the system processes out the first version of this data element. Similarly, when the $32^{nd}$ backup version is produced, the system processes out the second version, and so on. According to another example, the system may keep only those versions stored in the past 30 days. Alternatively, more complicated criteria may be applied, to determine which data elements are to be processed out and which are to be kept.

Figure 10B:
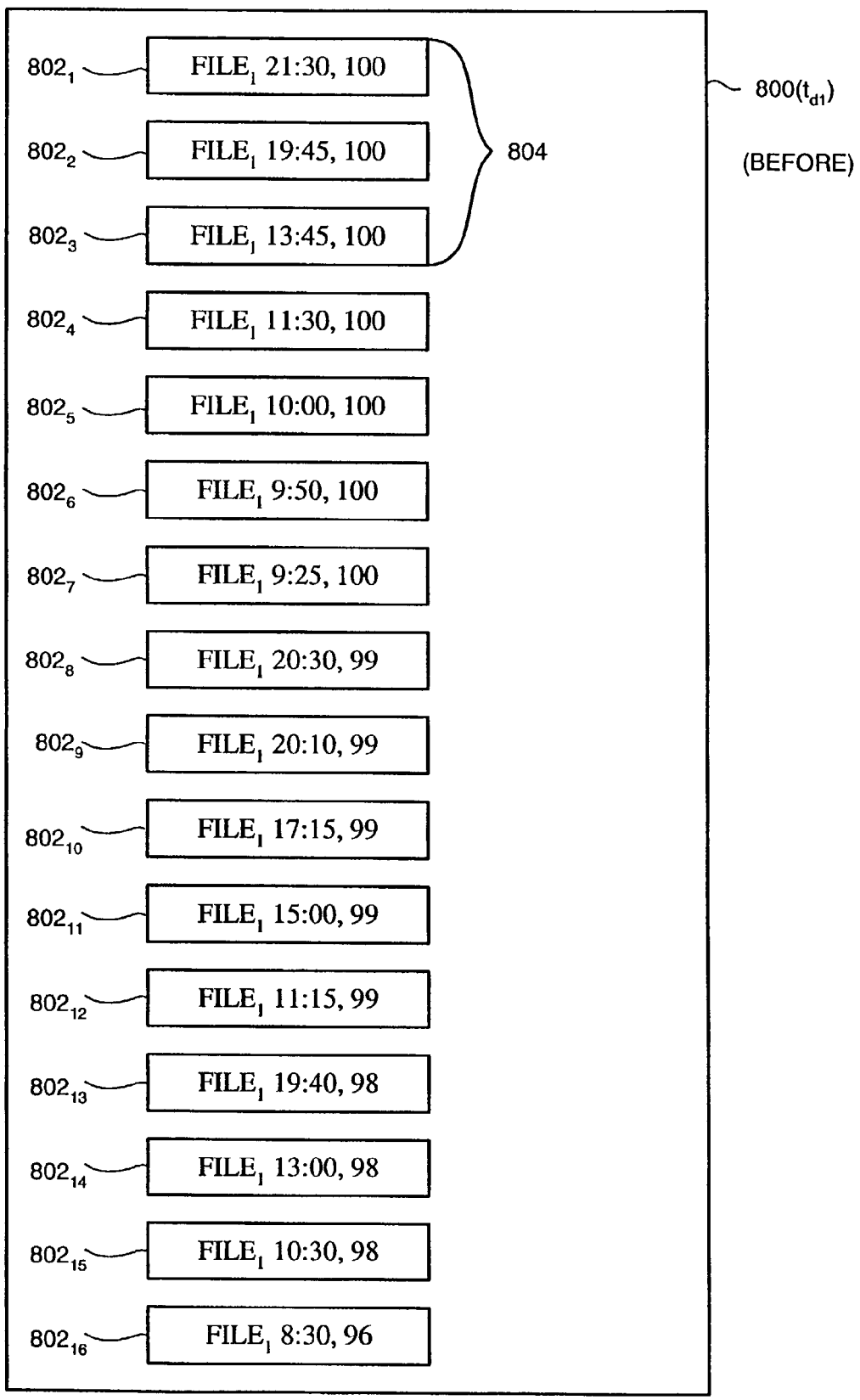
FIG. 10B is a schematic illustration of a backup storage unit, wherein versions of a file are kept according to the scheme of FIG. 10A.
Figure 10C:
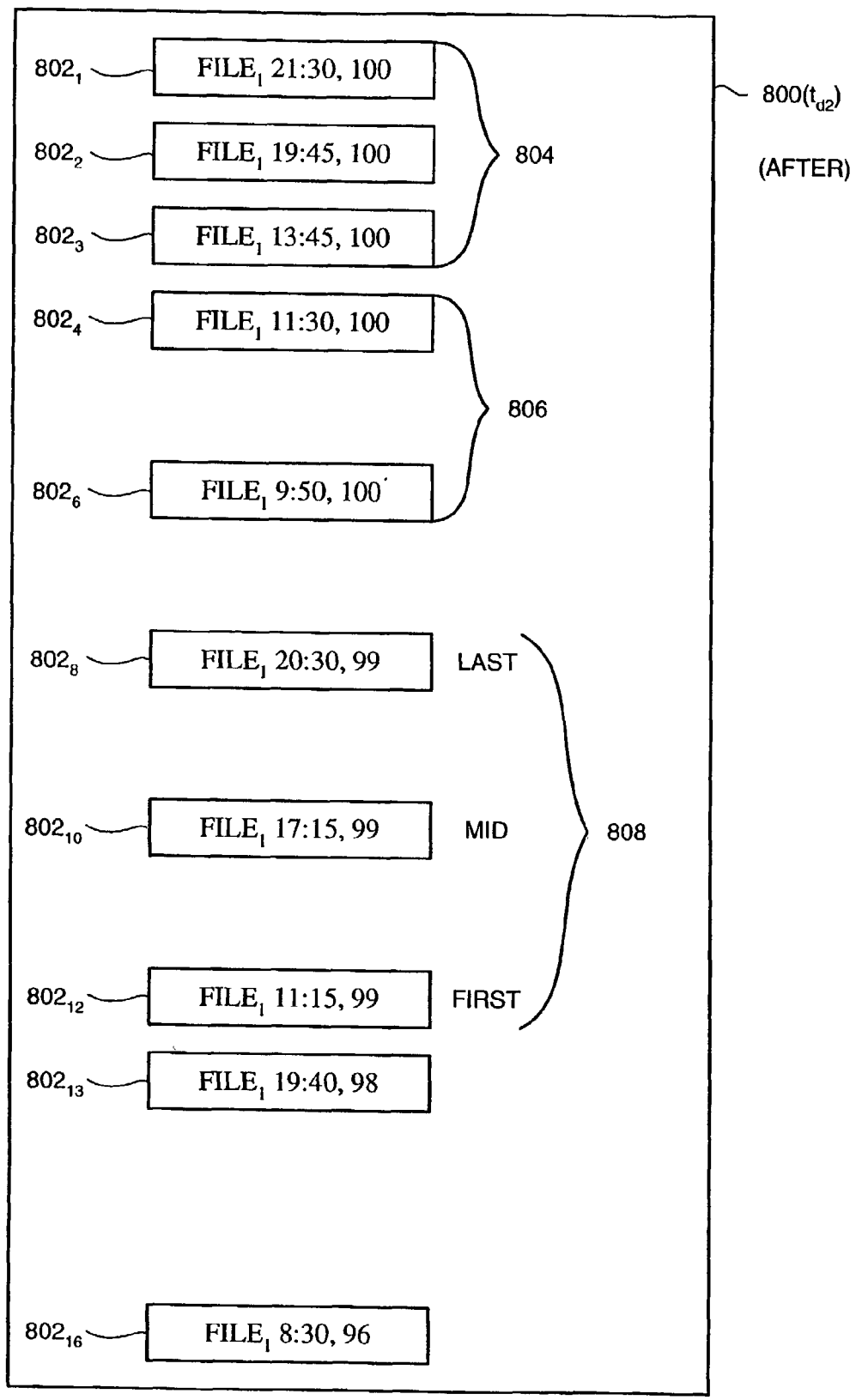
FIG. 10C is a schematic illustration of the backup storage unit of FIG. 10B, at another moment in time.

Reference is now made to FIGS. 10A, 10B and 10C. FIG. 10A is an illustration of a scheme, generally referenced 700, representing criteria for keeping files in a backup system, according to a further embodiment the disclosed technique. FIG. 10B is a schematic illustration of a backup storage unit 800, wherein versions of a file are kept according to scheme 700 (FIG. 10A). FIG. 10C is a schematic illustration of backup storage unit 800 (FIG. 10B) at another moment in time.

According to the scheme illustrated in FIG. 10A, the time period from the creation of the file, until the present, is divided into smaller time periods. The criteria for keeping files include a specific rule for each time period, generally referenced $702_i$.

According to the rule $702_1$, the backup system keeps all of the files from the last 12 hours. According to the rule $702_2$, the backup system keeps only 50% of the files from the previous 12 hours. For example, the system may keep all of the even-numbered versions, (e.g., all the versions $V_K$, wherein K is an even integer). It is noted that the term "previous", as used in the present description in describing a specific time period, is relative to the time period immediately succeeding that specific time period. For example, the time period associated with rule $702_3$, is the day that ended when the time period of rule $702_2$ began.

According to rule $702_3$, the backup system also keeps three versions from the previous day (i.e., the day before the date of the deletion session)—the first and last versions from that previous day, and another version from the middle of the day (e.g., the version whose version number is nearest the average of the first and last version numbers). The backup system further keeps the last version from each of the previous three days (rules $702_4$, $702_5$ and $702_6$). The last version from the previous three days is kept according to rule $702_7$. The last version from the previous four days is kept according to rule $702_8$. The last version from each of the previous 2 weeks, is kept according to rules $702_9$ and $702_{10}$. The last version from the previous two weeks is kept according to rule $702_{11}$. The last version from the previous month, is kept according to rule $702_{12}$. The last version from the previous 2 months, is kept according to rule $702_{13}$. The last version from the previous 4 months, is kept according to rule $702_{14}$. The last version and a middle version from the previous year, are kept according to rule $702_{15}$. One version from each of the previous years, is kept according to rules $702_{16}$ and the subsequent rules (not shown). The system always keeps the original version, according to rule $702_R$ (wherein R is an integer).

It is noted that in addition to the rules $702_i$, complimentary rules may apply to special cases. For example, if the original version was created during one of the specified time periods (e.g., the time period respective of rule $702_4$), the backup system may keep only the original version from this time period. It is further noted that the available data element versions determine the available history-data-portions (such as the history-data-portions illustrated in FIG. 5F), and thus determine the restorable storage area versions.

The backup system periodically holds deletion sessions, wherein files are deleted in accordance with predetermined criteria such as the rules $702_i$. The timing of the deletion session may be determined by a scheduler such as scheduler 110 (FIG. 1).

In the present example, deletion sessions are held every 12 hours, at noon and at midnight of every day. It is noted that the timing of deletion sessions may be independent of the timing of backup sessions. It is further noted that the timing of the deletion sessions is generally independent of the deletion rules. For example, the same rules $702_i$ may be applied with deletion sessions taking place every 24 hours.

With reference to FIG. 10B, the storage unit 800 is shown at a time $t_{d1}$, immediately before a deletion session (i.e., it is assumed that no changes take place between $t_{d1}$ and the deletion session). Backup storage unit 800 includes at time $t_{d1}$ a plurality of file versions $802_i$ (i being an integer), each version characterized by a time and date at which the version was stored. It is noted that backup storage unit 800 may further include other backed up files and previous versions thereof.

A group of versions referenced 804 (versions $802_1$, $802_2$ and $802_3$) includes versions which were stored between the last deletion session (at noon) and $t_{d1}$. The rest of the versions were not deleted during previous deletion sessions, in accordance with the rules $702_i$ (FIG. 10A).

With reference to FIG. 10C, the storage unit 800 is shown at time $t_{d2}$, immediately after a deletion session (i.e., it is assumed that no changes have taken place between the deletion session and $t_{d2}$). Backup storage unit 800 includes at time $t_{d2}$ the versions $802_i$, which have been kept during the deletion session held at 12 midnight, according to the rules $702_i$.

Version group 804 includes versions from the last 12 hours. In accordance with rule $702_1$, all of the versions of the group 804 are kept. A group of versions referenced 806 (versions $802_4$ and $802_6$), includes every other version from the previous 12 hours, in accordance with rule $702_2$. Accordingly, versions $802_5$ and $802_7$ have been deleted. A group of versions referenced 808 (versions $802_8$, $802_{10}$ and $802_{12}$) includes three versions from the previous day. In accordance with rule $702_3$, the last version $802_8$, the middle version $802_{10}$ and the first version $802_{12}$, are kept, while versions $802_9$ and $802_{11}$ have been deleted. In accordance with rule $702_4$, only the last version $802_{13}$ from the previous day is kept, and the rest of the versions $802_{14}$ and $802_{15}$ are deleted. The original version $802_{16}$ is kept according to rule $702_R$.

It will be appreciated by persons skilled in the art that the disclosed technique is not limited to what has been particularly shown and described here in above. Rather the scope of the disclosed technique is defined only by the claims which follow.

The invention claimed is:

1. Backup system for backing up basic data elements accessible via a network, the backup system comprising:
   A controller;
   A communication interface, coupled with said controller and with said network;
   A backup storage unit, coupled with said controller, for storing backup versions of said basic data elements;
   A comparator, coupled with said controller, said backup storage unit and with said communication interface, for comparing between a list of basic data elements from a storage area of said network and a respective list of backed up basic data elements, thereby detecting new basic data elements listed in said list of basic data elements and absent from said respective list of backed up basic data elements, modified basic data elements listed in said list of data elements differently than in said respective list of backed up basic data elements and deleted basic data elements absent from said list of basic data elements and listed in said respective list of backed up basic data element;
   wherein said controller backs up said storage area of said network by copying the entirety of said new basic data elements and said modified basic data elements into said backup storage unit, and
   wherein said controller produces a deleted-element indicator respective of each of said deleted basic data elements, in said backup storage unit.

2. The backup system according to claim 1, wherein said storage unit comprises a current-backup section, for storing most recent backup versions, and a history-backup section, for storing older backup versions, moved thereto from said current-backup section, wherein said controller moves a backup version of a selected basic data element from said current-backup section to said history-backup section, when retrieving a modified version of said selected basic data element, or when producing a deleted-element indicator for said selected basic data elements.

3. The backup system according to claim 1, further comprising a schedule, coupled with said controller, for scheduling backup sessions.

4. The backup system according to claim 3, wherein said scheduler schedules backup sessions according to predetermined period of time.

5. The backup system according to claim 3, wherein said scheduler schedules backup sessions randomly.

6. The backup system according to claim 1, further comprising an auxiliary backup unit, coupled with said controller, for backing up selected portions of said backup storage unit.

7. The backup system according to claim 1, further comprising a database, including a plurality of records, each of said records being respective of a basic data element or a deleted-element indicator, stored in said backup storage unit.

8. The backup system according to claim 1, wherein said communication interface is a network interface.

9. Method for backing up basic data elements accessible via a network, the method comprising the procedure of:

accessing a data storage area at selected points in time;

retrieving a list of basic data elements from said data storage area;

selecting different between said list of basic data elements and a respective list of backed up basic data element;

storing a backup copy of a new basic data element by copying the entirety of said new basic data element from said data storage, when said new basic data element is listed in said list of basic data element and absent from said respective list of backed up basic data elements;

storing a backup copy of modified basic data element by copying the entirety of said modified basic data element from said storage data storage, when said modified basic data element is listed in said list of data elements differently than in said respective list of backed up data elements; and producing a deleted-element indicator respective of a deleted basic data element, when said deleted basic data element is listed in said respective list of backup basic data elements and absent from said list of basic data elements.

10. The method according to claim 9, further comprising the procedure of rearranging previously backup copies of said modified basic data element and said deleted basic data elements.

11. The method according to claim 10, wherein said procedure of rearranging includes at least moving said previously backup copies from a current backup section to a history backup section.

12. The method according to claim 9, further comprising the procedure of deleting previous backup copies of said basic data elements.

13. The method, according to claim 9, wherein said basic data elements are selected from the list consisting of:

files;

database records;

Email messages.

\* \* \* \* \*

UNITED STATES PATENT AND TRADEMARK OFFICE
CERTIFICATE OF CORRECTION

| | | |
|---|---|---|
| PATENT NO. | : 7,774,315 B1 | Page 1 of 1 |
| APPLICATION NO. | : 10/157261 | |
| DATED | : August 10, 2010 | |
| INVENTOR(S) | : Eldad Galker | |

It is certified that error appears in the above-identified patent and that said Letters Patent is hereby corrected as shown below:

On the Title Page, Item (63) the related US application is missing and should read –
CIP of 09/267,549 filed March 12, 1999

Signed and Sealed this
Twenty-eighth Day of February, 2012

David J. Kappos
*Director of the United States Patent and Trademark Office*